US010910711B2

United States Patent
Ananth et al.

(10) Patent No.: US 10,910,711 B2
(45) Date of Patent: Feb. 2, 2021

(54) BEAMFORMING CALIBRATION

(71) Applicant: Loon LLC, Mountain View, CA (US)

(72) Inventors: Sharath Ananth, Mountain View, CA (US); Pascal Stang, Mountain View, CA (US)

(73) Assignee: Loon LLC, Mountain View, CA (US)

( * ) Notice: Subject to any disclaimer, the term of this patent is extended or adjusted under 35 U.S.C. 154(b) by 0 days.

(21) Appl. No.: 15/931,931

(22) Filed: May 14, 2020

(65) Prior Publication Data

US 2020/0274240 A1   Aug. 27, 2020

Related U.S. Application Data

(63) Continuation of application No. 15/810,909, filed on Nov. 13, 2017, now Pat. No. 10,734,721.

(51) Int. Cl.
*H01Q 3/26* (2006.01)
*H04B 17/21* (2015.01)
*H04B 17/12* (2015.01)
*H04B 7/06* (2006.01)

(52) U.S. Cl.
CPC .......... *H01Q 3/267* (2013.01); *H04B 7/0617* (2013.01); *H04B 17/12* (2015.01); *H04B 17/21* (2015.01)

(58) Field of Classification Search
CPC ........ H01Q 3/267; H04B 17/12; H04B 17/21; H04B 7/0617
See application file for complete search history.

(56) References Cited

U.S. PATENT DOCUMENTS

| | | | |
|---|---|---|---|
| 6,480,153 | B1 | 11/2002 | Jung et al. |
| 6,597,730 | B1 | 7/2003 | Bader |
| 6,628,941 | B2 | 9/2003 | Knoblach et al. |
| 7,203,491 | B2 | 4/2007 | Knoblach et al. |
| 7,356,390 | B2 | 4/2008 | Knoblach et al. |
| 7,469,857 | B2 | 12/2008 | Voss |

(Continued)

FOREIGN PATENT DOCUMENTS

WO   2017213706 A1   12/2017

OTHER PUBLICATIONS

"International Search Report and Written Opinion for Application No. PCT/US2018/059185 dated Feb. 28, 2019", 14 pages.

*Primary Examiner* — Marc Anthony Armand
(74) *Attorney, Agent, or Firm* — Botos Churchill IP Law

(57) ABSTRACT

Systems, methods, and computer-readable media for receiver channel calibration are provided. The method includes generating a plurality of calibration signals corresponding to a plurality of receiver channels, respectively. The plurality of calibration signals are combined with a plurality of data signals, respectively, thereby generating a plurality of combined signals. The plurality of combined signals are propagated through at least portions of the plurality of receiver channels, respectively. The plurality of calibration signals are extracted from the propagated plurality of combined signals, respectively. At least two signal characteristics of at least two of the extracted plurality of calibration signals are compared. At least one adjustment in gain, phase, or timing for at least one of the receiver channels is identified based on a result of the comparing. Based on the identified adjustment, a data signal received via the at least one of the plurality of receiver channels is adjusted.

20 Claims, 13 Drawing Sheets

(56) References Cited

U.S. PATENT DOCUMENTS

| | | |
|---|---|---|
| 7,801,522 B2 | 9/2010 | Knoblach et al. |
| 8,820,678 B2 | 9/2014 | Devaul et al. |
| 8,825,232 B2 | 9/2014 | Knoblach et al. |
| 8,967,533 B2 | 3/2015 | Devaul et al. |
| 9,139,279 B2 | 9/2015 | Heppe |
| 9,296,461 B1 | 3/2016 | Roach |
| 9,329,600 B2 | 5/2016 | Devaul et al. |
| 9,409,646 B2 | 8/2016 | Fleck |
| 9,418,243 B2 | 8/2016 | Bauer et al. |
| 9,419,902 B1 | 8/2016 | Sites |
| 9,420,023 B2 | 8/2016 | Ramamurthy et al. |
| 9,519,045 B2 | 12/2016 | Knoblach et al. |
| 9,632,503 B2 | 4/2017 | Knoblach et al. |
| 9,836,063 B1 | 12/2017 | Bonawitz et al. |
| 10,305,609 B1 | 5/2019 | Stang et al. |
| 2002/0128007 A1 | 9/2002 | Miyatani |
| 2005/0272339 A1 | 12/2005 | Richardson |
| 2005/0272392 A1 | 12/2005 | Richardson |
| 2006/0234694 A1 | 10/2006 | Kawasaki et al. |
| 2010/0230968 A1 | 9/2010 | Chernyshov |
| 2012/0250493 A1 | 10/2012 | Liao et al. |
| 2012/0293362 A1* | 11/2012 | Liang .............. H01Q 3/2605 342/174 |
| 2013/0110442 A1 | 5/2013 | Nishimura et al. |
| 2013/0301434 A1 | 11/2013 | Krishnamurthy |
| 2013/0343490 A1 | 12/2013 | Wertz et al. |
| 2014/0111373 A1 | 4/2014 | Puzella et al. |
| 2016/0050034 A1 | 2/2016 | Pearse et al. |

\* cited by examiner

BEAMFORMING CALIBRATION

CROSS REFERENCE TO RELATED APPLICATIONS

This application is a continuation of U.S. patent application Ser. No. 15/810,909, filed Nov. 13, 2017, the entire disclosure of which is incorporated by reference herein.

BACKGROUND

Some communication systems include an antenna array and perform beamforming by electronically controlling the directionality of radio frequency (RF) energy transmission or reception, for instance, to provide connectivity service to subscribers located in a geographical area. To control the directionality of RF energy transmission or reception with precision, hi-fidelity control of RF transmitters and receivers is required. One technique for achieving hi-fidelity control of RF transmitters and receivers is to perform loopback calibration of the transmit and receive channels corresponding to the elements of the antenna array to determine, and compensate for, phase, amplitude, and group delay characteristics of the signals propagating through the various channels. Loopback calibration, however, typically involves an interruption in the service provided by the RF transmitter or receiver. Some communication protocols, such as frequency-division long-term evolution (FD-LTE), require an RF transmitter and receiver that provide continuous service and thus may not be interrupted for calibration. In view of the foregoing, the present disclosure relates to systems and methods for calibrating RF transmit and receive channels of systems that employ beamforming.

SUMMARY

In accordance with an aspect of the present disclosure, a method for receiver channel calibration is described. The method includes generating a plurality of calibration signals corresponding to a plurality of receiver channels, respectively. The plurality of calibration signals are combined with a plurality of data signals, respectively, thereby generating a plurality of combined signals. The plurality of combined signals are propagated through at least portions of the plurality of receiver channels, respectively. The plurality of calibration signals are extracted from the propagated plurality of combined signals, respectively. At least two signal characteristics of at least two of the extracted plurality of calibration signals are compared. At least one adjustment in gain, phase, or timing for at least one of the receiver channels is identified based on a result of the comparing. Based on the at least one identified adjustment, a data signal received via the at least one of the plurality of receiver channels is adjusted.

In another aspect of the present disclosure, the plurality of calibration signals and the plurality of data signals are independently recoverable from the plurality of combined signals, respectively.

In a further aspect herein, the plurality of calibration signals are upconverted to a frequency range within an operational frequency band of the plurality of data signals, and have amplitudes below a predetermined noise threshold.

In yet another aspect, the plurality of calibration signals are upconverted to a frequency range outside an operational frequency band of the plurality of data signals.

In still a further aspect herein, the plurality of calibration signals are generated based on baseband signals that have frequency content proximal to a direct current (DC) subcarrier signal.

In another aspect, the plurality of data signals include at least one of a long term evolution (LTE) signal, a universal mobile telecommunications system (UMTS) signal, or a global system for mobile communications (GSM) signal.

In a further aspect, the plurality of calibrations signals include at least one of a Zadoff-Chu sequence, a Walsh-Hadamard sequence, or another orthogonal signal.

In still another aspect herein, the extracting of the plurality of calibration signals includes correlating a sum of the propagated plurality of combined signals with a calibration sequence corresponding to one of the plurality of calibration signals.

In accordance with another aspect of the present disclosure, a system for transmitter channel calibration is described. The system includes a receiver module, a calibration processor, a coupling module, and a weighting matrix and calibration injection module. The receiver module includes a plurality of receivers corresponding to a plurality of receiver channels, respectively. The calibration processor is configured to: generate a plurality of calibration signals corresponding to the plurality of receiver channels, respectively. The coupling module is configured to: combine the plurality of calibration signals with a plurality of data signals, respectively, thereby generating a plurality of combined signals, and propagate the plurality of combined signals through at least portions of the plurality of receiver channels, respectively. The calibration processor is further configured to: extract the plurality of calibration signals from the propagated plurality of combined signals, respectively; compare at least two signal characteristics of at least two of the extracted plurality of calibration signals; and identify at least one adjustment in gain, phase, or timing for at least one of the receiver channels based on a result of the comparing. The weighting matrix and calibration injection module is configured to adjust a data signal received via the at least one of the plurality of receiver channels based on the at least one identified adjustment.

In another aspect of the present disclosure, the plurality of calibration signals and the plurality of data signals are independently recoverable from the plurality of combined signals, respectively.

In a further aspect herein, the system further includes a transmitter module that upconverts the plurality of calibration signals, respectively, to a frequency range within an operational frequency band of the plurality of data signals, with the plurality of upconverted calibration signals having amplitudes below a predetermined noise threshold.

In yet another aspect, the plurality of calibration signals are upconverted to a frequency range outside an operational frequency band of the plurality of data signals.

In still a further aspect herein, the plurality of calibration signals are generated based on baseband signals that have frequency content proximal to a direct current (DC) subcarrier signal.

In another aspect, the plurality of data signals include at least one of a long term evolution (LTE) signal, a universal mobile telecommunications system (UMTS) signal, or a global system for mobile communications (GSM) signal.

In a further aspect, the plurality of calibrations signals include at least one of a Zadoff-Chu sequence, a Walsh-Hadamard sequence, or another orthogonal signal.

In still another aspect herein, the extracting of the plurality of calibration signals includes correlating a sum of the propagated plurality of combined signals with a calibration sequence corresponding to one of the plurality of calibration signals.

In a further aspect of the present disclosure, the calibration processor, the coupling module, and the weighting matrix and calibration injection module are integrated onto a single circuit board.

In accordance with another aspect of the present disclosure, a non-transitory computer-readable medium is described. The computer-readable medium has instructions stored thereon that, when executed by a processor, cause the processor to implement a method for receiver channel calibration. The method includes generating a plurality of calibration signals corresponding to a plurality of receiver channels, respectively. The plurality of calibration signals are combined with a plurality of data signals, respectively, thereby generating a plurality of combined signals. The plurality of combined signals are propagated through at least portions of the plurality of receiver channels, respectively. The plurality of calibration signals are extracted from the propagated plurality of combined signals, respectively. At least two signal characteristics of at least two of the extracted plurality of calibration signals are compared. At least one adjustment in gain, phase, or timing for at least one of the receiver channels is identified based on a result of the comparing. Based on the at least one identified adjustment, a data signal received via the at least one of the plurality of receiver channels is adjusted.

In another aspect, the plurality of calibration signals and the plurality of data signals are independently recoverable from the plurality of combined signals, respectively.

In a further aspect, the non-transitory computer-readable medium has further instructions stored thereon that, when executed by the processor, cause the processor to extract the plurality of calibration signals by correlating a sum of the propagated plurality of combined signals with a calibration sequence corresponding to one of the plurality of calibration signals.

BRIEF DESCRIPTION OF THE DRAWINGS

Various aspects and features of the present systems and methods for beamforming calibration are described herein below with references to the drawings, wherein.

DETAILED DESCRIPTION

The present disclosure is directed to systems and methods for calibrating RF transmit and receive channels of devices that employ beamforming and/or beamsteering. In one aspect, the systems and methods of the present disclosure enable loopback calibration of RF transmit and receive channels of systems to be performed without causing any interruption of the service provided by the RF transmitters and receivers. In one aspect, for each channel, a calibration signal is injected into each transmitted data signal in a manner that does not interfere with the data signal. The combined calibration signal and data signal are fed back to a sensor that extracts the calibration signal and forwards it to a calibration processor. The calibration processor determines the gain, phase, timing (e.g., group delay) characteristics based on the combined signal and determines one or more adjustments to be made to subsequently transmitted LTE signals along that channel to compensate for the determined phase, amplitude, and group delay characteristics.

Figure 1:
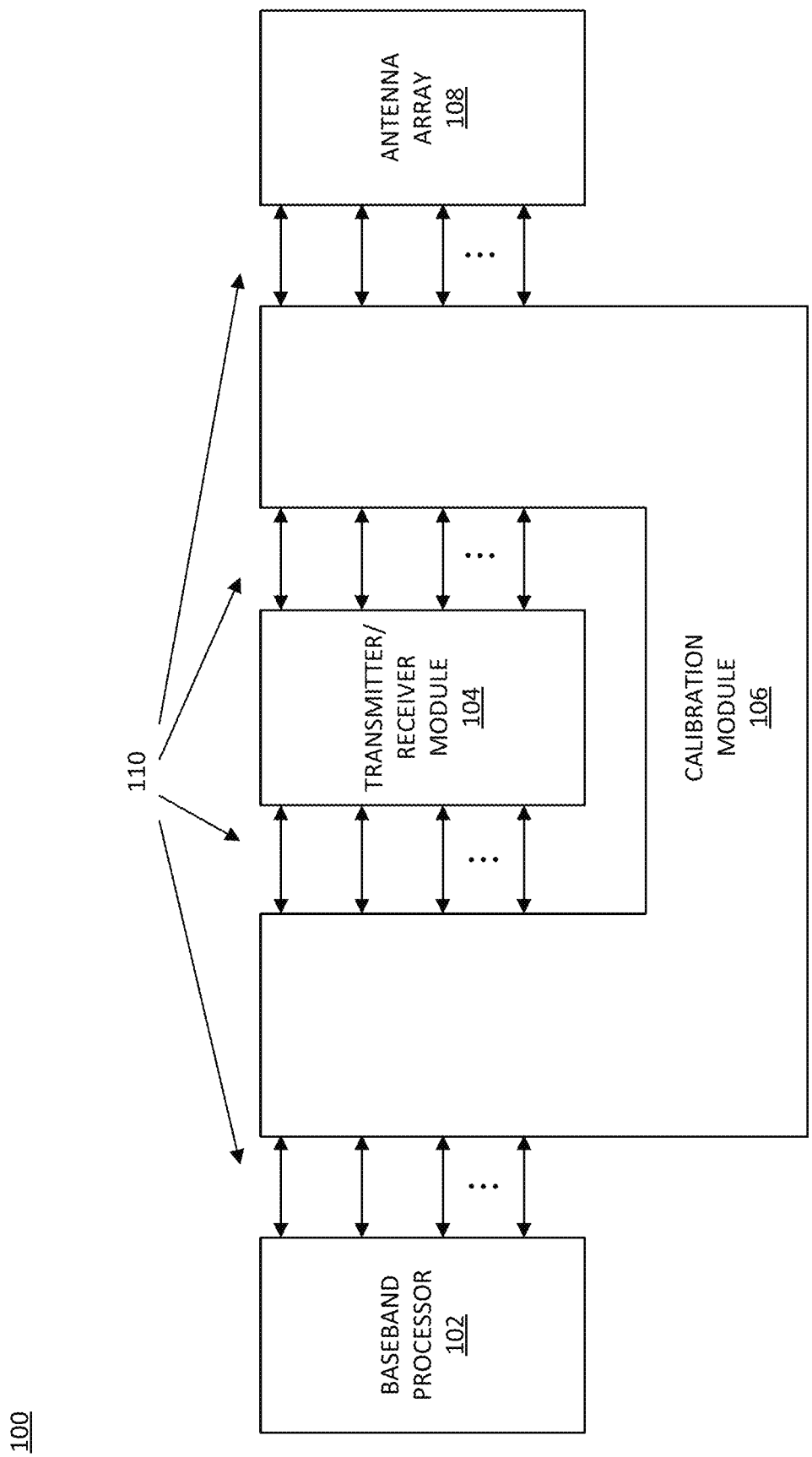
FIG. 1 is a schematic diagram of an illustrative system for beamforming calibration, in accordance with an embodiment of the present disclosure.

With reference to FIG. 1, a system 100 includes a baseband processor 102, an integrated transmitter and receiver module 104, a calibration module 106, and an antenna array 108. In some examples, each of the baseband processor 102, the transmitter and receiver module 104, and the calibration module 106 is a circuit card assembly that includes hardware components and/or software components (not separately shown in FIG. 1). In some embodiments, as described below in the context of FIG. 2 and FIG. 3, the calibration module 106 includes components for calibration transmitter channels and components for calibrating receiver channels. The baseband processor 102 and the antenna array 108 are communicatively coupled to one another by way of wired and/or wireless communication paths 110, the transmitter and receiver module 104, and the calibration module 106. The baseband processor 102 is a radio system that translates between user data and signals suitable for over-the-air transmission and reception. In some examples, the baseband processor 102 also performs other functions of coding, protocol, and negotiation for establishing a radio link in a known manner.

The transmitter and receiver module 104 includes multiple (for example, 8) transmitter channels and multiple (for example, 8) receiver channels. In general, each transmitter channel of the transmitter and receiver module 104 converts baseband data received from the baseband processor 102 into an RF signal to be transmitted via the antenna array 108, and each receiver channel of the transmitter and receiver module 104 converts an RF signal received via the antenna array 108 into baseband data to be provided to the baseband processor 102. In some examples, the transmitter and receiver module 104 includes various components, such as modulators, up-converters, down-converters, RF amplifiers, and/or filters (not separately shown in FIG. 1), that perform corresponding functions in a known manner.

The antenna array 108 includes multiple antenna elements (not separately shown in FIG. 1). Each of the antenna elements of the antenna array 108 converts an RF signal received from a corresponding transmitter of the transmitter and receiver module 104 (by way of a corresponding channel of the calibration board 106) into a corresponding electromagnetic (EM) wave that is propagated in free space. Each of the antenna elements of the antenna array 108 also converts an electromagnetic (EM) wave incident thereon into a corresponding RF signal that is forwarded to a corresponding receiver of the transmitter and receiver module 104 (by way of a corresponding channel of the calibration module 106).

The calibration module 106 is interposed between the transmitter and receiver module 104 and the antenna array 108 and includes at least one transmitter channel and at least one receiver channel. In some embodiments, the calibration module 106 includes multiple (for example, 8) transmitter channels and multiple (for example, 8) receiver channels. In general, each transmitter channel of the calibration module 106 routes a portion of an RF signal received from a corresponding transmitter channel of the transmitter and receiver module 104 to a corresponding antenna element of the antenna array 108, and processes another portion of that RF signal for calibration purposes, as described in further detail herein. Each receiver channel of the calibration module 106 routes a portion of an RF signal received from a corresponding antenna element of the antenna array 108 to a corresponding receiver channel of the transmitter and receiver module 104, and processes another portion of that RF signal for calibration purposes, as described in further detail herein.

Figure 2:
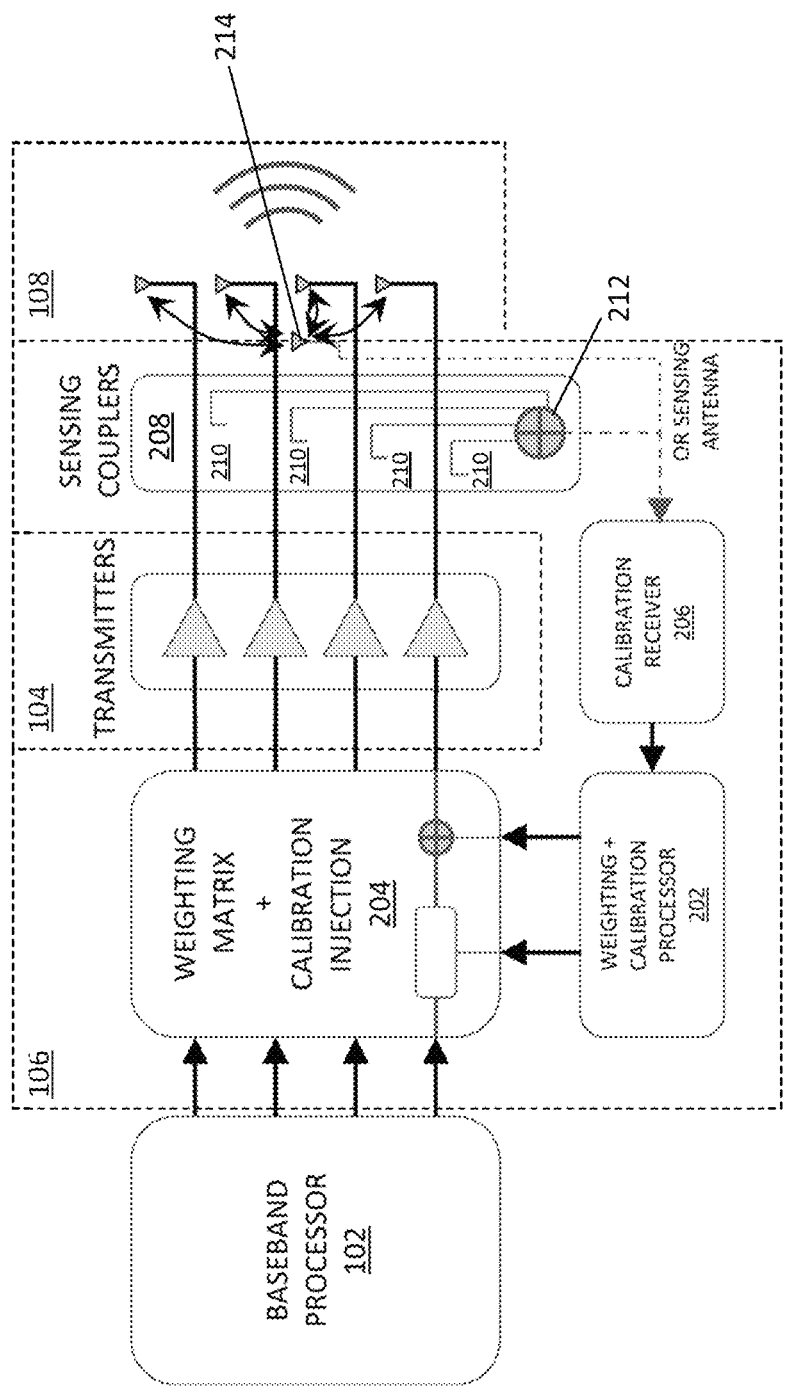
FIG. 2 is a schematic diagram showing aspects of a portion of the system of FIG. 1 for beamforming calibration of transmitter channels, in accordance with an embodiment of the present disclosure.
Figure 3:
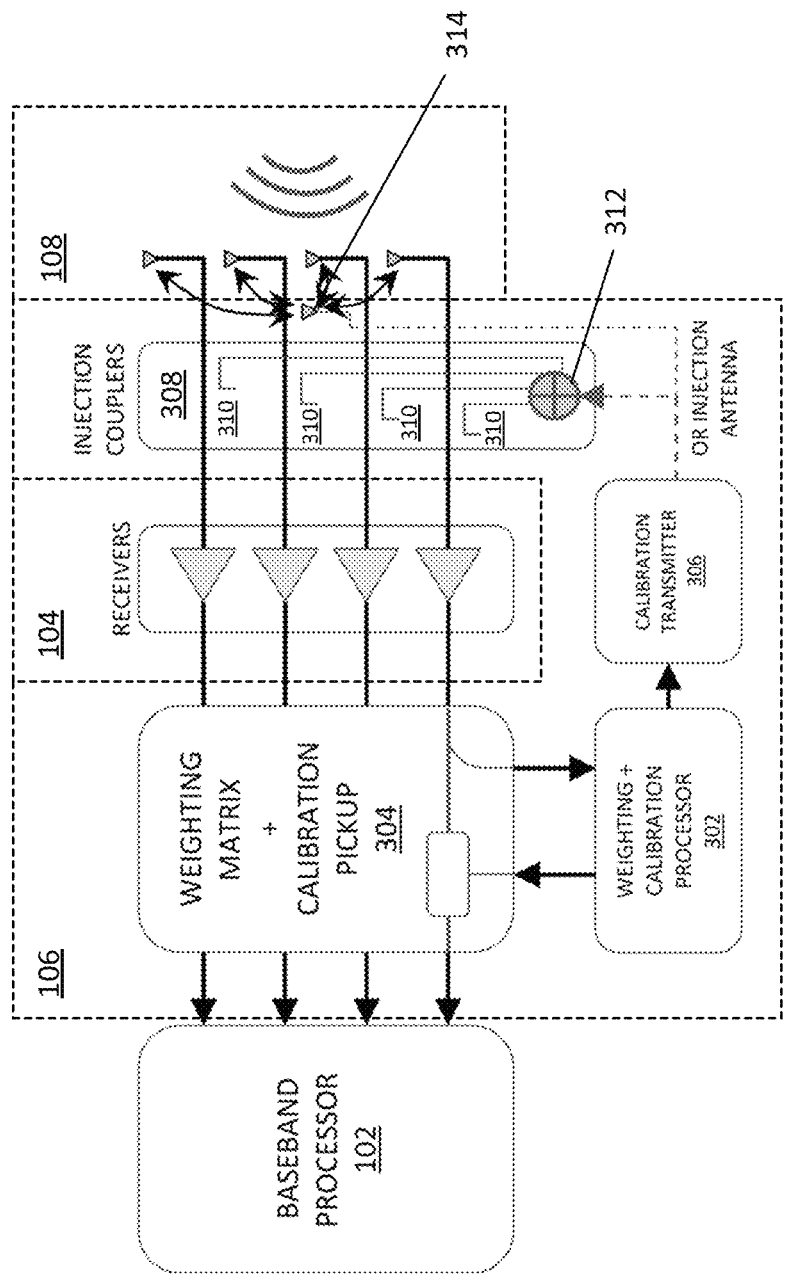
FIG. 3 is a schematic diagram showing aspects of a portion of the system of FIG. 1 for beamforming calibration of receiver channels, in accordance with an embodiment of the present disclosure.

Having provided a general description of the system 100 for beamforming calibration in connection with FIG. 1, reference is now made to FIG. 2 and FIG. 3 to describe further aspects of the system 100 for performing beamforming calibration of transmitter channels and receiver channels. For illustrative purposes, portions of the system 100 for transmitter channel calibration and receiver channel calibration are shown and described separately in connection with FIG. 2 and FIG. 3, respectively. FIG. 2 is a schematic diagram showing aspects of a portion of the system 100 of FIG. 1 for performing beamforming calibration of transmitter channels, in accordance with an embodiment of the present disclosure. The calibration module 106 includes a weighting and calibration processor module 202, a weighting matrix and calibration injection module 204, a calibration receiver module 206, and a coupling module 208. The weighting and calibration processor module 202 generates and observes calibration signals, computes calibration results, and prescribes corrective adjustments to the transmitted signals. In some embodiments, the weighting and calibration processor module 202 may be incorporated into the baseband processor 102.

The weighting matrix and calibration injection module 204 implements weighting features for phasing the antenna array 108 to achieve electronic beamforming on the transmit side. The weighting matrix and calibration injection module 204 also implements any corrective adjustments to the transmitted signals that may be commanded by the weighting and calibration processor module 202. In addition, the weighting matrix and calibration injection module 204 injects into data signals provided from the baseband processor 102 calibration signals that were generated by the weighting and calibration processor module 202 for the transmitter channels, and provides the combination of the data signals including the calibration signals to the transmitters of the transmitter and receiver module 104. In some embodiments, the weighting matrix and calibration injection module 204 may be incorporated into the baseband processor 102.

The calibration receiver module 206 receives from the coupling module 208 a summed RF signal that is based upon coupled portions of RF signals transmitted by the transmitters of the transmitter and receiver module 104. In some embodiments, the receiver channels of the receiver module 206 are implemented using receiver channels similar to components used for the transmitter and receiver module 104 and function in a similar manner.

The coupling module 208 includes multiple channels corresponding to the multiple transmitter channels, respectively, of the transmitter and receiver module 104. Each channel of the coupling module 208 includes an RF coupler 210 that couples a portion of the RF signal received from the corresponding transmitter of the transmitter and receiver module 104 and provides the portion of the RF signal to a combiner 212 of the coupling module 208, which adds the RF signals coupled by the RF couplers 210, and provides an RF signal representing the resulting sum of the added RF signals to the calibration receiver module 206 for processing. In some embodiments, instead of including the RF couplers 210 and the combiner 212, the coupling module 208 includes a calibration antenna element 214 that receives each of the EM signals transmitted from the transmitter channels of the transmitter and receiver module 104 via corresponding antenna elements of the antenna array 108 and converts the received EM signals into an RF signal that is provided to the calibration receiver module 206 for processing.

FIG. 3 is a schematic diagram showing aspects of a portion of the system 100 of FIG. 1 for performing beamforming calibration of receiver channels, in accordance with an embodiment of the present disclosure. The calibration module 106 includes a weighting and calibration processor module 302, a weighting matrix and calibration pickup module 304, a calibration transmitter module 306, and an injection module 308. Although the naming and reference numbers of components of the calibration module 106 shown in FIG. 3 may be different from those shown in FIG. 2, in some embodiments, components of the calibration module 106 shown in FIG. 2 and FIG. 3 may be integrated with one another. For example, the weighting and calibration processor module 202 (FIG. 2) may be integrated with the weighting and calibration processor module 302 (FIG. 3), the weighting matrix and calibration injection module 204 (FIG. 2) may be integrated with the weighting matrix and calibration pickup module 304 (FIG. 3), the calibration receiver module 206 may be integrated with the calibration transmitter module 306 (FIG. 3), and the coupling module 208 (FIG. 2) may be integrated with the injection module 308 (FIG. 3).

The weighting and calibration processor module 302 generates and observes calibration signals, computes calibration results, and prescribes corrective adjustments to the transmitted signals. In some embodiments, the weighting and calibration processor module 302 may be incorporated into the baseband processor 102.

The weighting matrix and calibration pickup module 304 implements weighting features for phasing the antenna array 108 to achieve electronic beamforming on the receiving side. The weighting matrix and calibration pickup module 304 also implements any corrective adjustments to the transmitted signals that may be commanded by the weighting and calibration processor module 302. In addition, the weighting matrix and calibration pickup module 304 extracts from the signals provided by the receiver channels of the transmitter and receiver module 104 calibration signals that were injected into data signals, and provides the extracted calibration signals to the weighting and calibration processor module 302. In some embodiments, the weighting matrix and calibration pickup module 304 may be incorporated into the baseband processor 102.

The calibration transmitter module 306 receives a calibration signal generated by the weighting and calibration processor module 302, and transmits the calibration signal to the injection module 308 so that the calibration signal may be injected into RF signals provided by the antenna elements of the antenna array 108. In some embodiments, the transmitter channels of the calibration transmitter module 306 are implemented using transmitter channels similar to those used for the transmitter and receiver module 104 and function in a similar manner.

The injection module 308 includes multiple channels corresponding to the multiple receiver channels, respectively, of the transmitter and receiver module 104. The injection module 308 also includes a splitter 312 that splits the calibration signal received from the calibration transmitter module 306 into multiple similar calibration signals and provides the similar calibration signals to the RF couplers 310 corresponding to the receiver channels, respectively, of the transmitter and receiver module 104. The RF coupler 310 of each channel of the injection module 308 couples a portion of the calibration signal received from the splitter 312 and injects the portion of the calibration signal into the RF data signal received from the corresponding antenna element of the antenna array 108. In some embodiments, instead of including the RF couplers 310 and the splitter 312, the coupling module 308 includes a calibration antenna element 314 that converts a calibration signal transmitted by the calibration transmitter module 306 into an EM signal and transmits the EM signal to the receiver channels of the transmitter and receiver module 104 via corresponding antenna elements of the antenna array 108.

Figure 4:
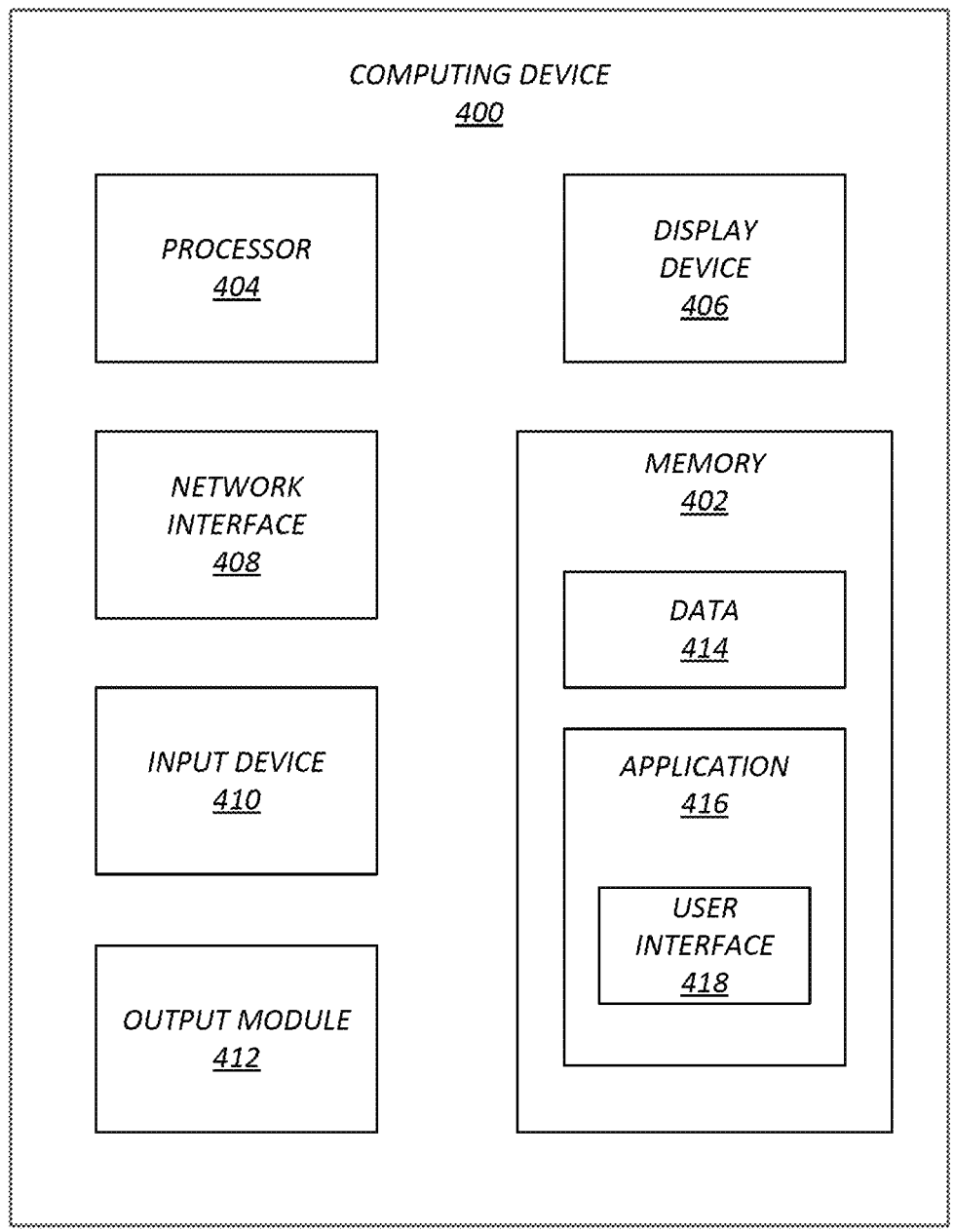
FIG. 4 is a schematic block diagram of an illustrative embodiment of a computing device that may be employed in various embodiments of the present information system, for instance, as part of the systems or components of FIG. 1, FIG. 2, or FIG. 3, in accordance with an embodiment of the present disclosure.

FIG. 4 is a schematic block diagram of a computing device 400 that may be employed in accordance with various embodiments herein. Although not explicitly shown in FIG. 1, FIG. 2, or FIG. 3, in some embodiments, the computing device 400, or one or more of the components thereof, may further represent one or more components of the system 100.

The computing device 400 may, in various embodiments, include one or more memories 402, processors 404, display devices 406, network interfaces 408, input devices 410, and/or output modules 412. The memory 402 includes non-transitory computer-readable storage media for storing data and/or software that is executable by the processor 404 and which controls the operation of the computing device 400. In embodiments, the memory 402 may include one or more solid-state storage devices such as flash memory chips. Alternatively, or in addition to the one or more solid-state storage devices, the memory 402 may include one or more mass storage devices connected to the processor 404 through a mass storage controller (not shown in FIG. 4) and a communications bus (not shown in FIG. 4). Although the description of computer readable media contained herein refers to a solid-state storage, it should be appreciated by those skilled in the art that computer-readable storage media can be any available media that can be accessed by the processor 404. That is, computer readable storage media includes non-transitory, volatile and non-volatile, removable and non-removable media implemented in any method or technology for storage of information such as computer-readable instructions, data structures, program modules or other data. Examples of computer-readable storage media include RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by computing device 400.

In some embodiments, the memory 402 stores data 414 and/or an application 416. In some aspects the application 416 includes a user interface component 418 that, when executed by the processor 404, causes the display device 406 to present a user interface (not shown in FIG. 4). The network interface 408, in some embodiments, is configured to couple the computing device 400 and/or individual components thereof to a network, such as a wired network, a wireless network, a local area network (LAN), a wide area network (WAN), a wireless mobile network, a Bluetooth network, the Internet, and/or another type of network. The input device 410 may be any device by means of which a user may interact with the computing device 400. Examples of the input device 410 include without limitation a mouse, a keyboard, a touch screen, a voice interface, and/or the like. The output module 412 may, in various embodiments, include any connectivity port or bus, such as, for example, a parallel port, a serial port, a universal serial bus (USB), or any other similar connectivity port known to those skilled in the art.

Figure 5:
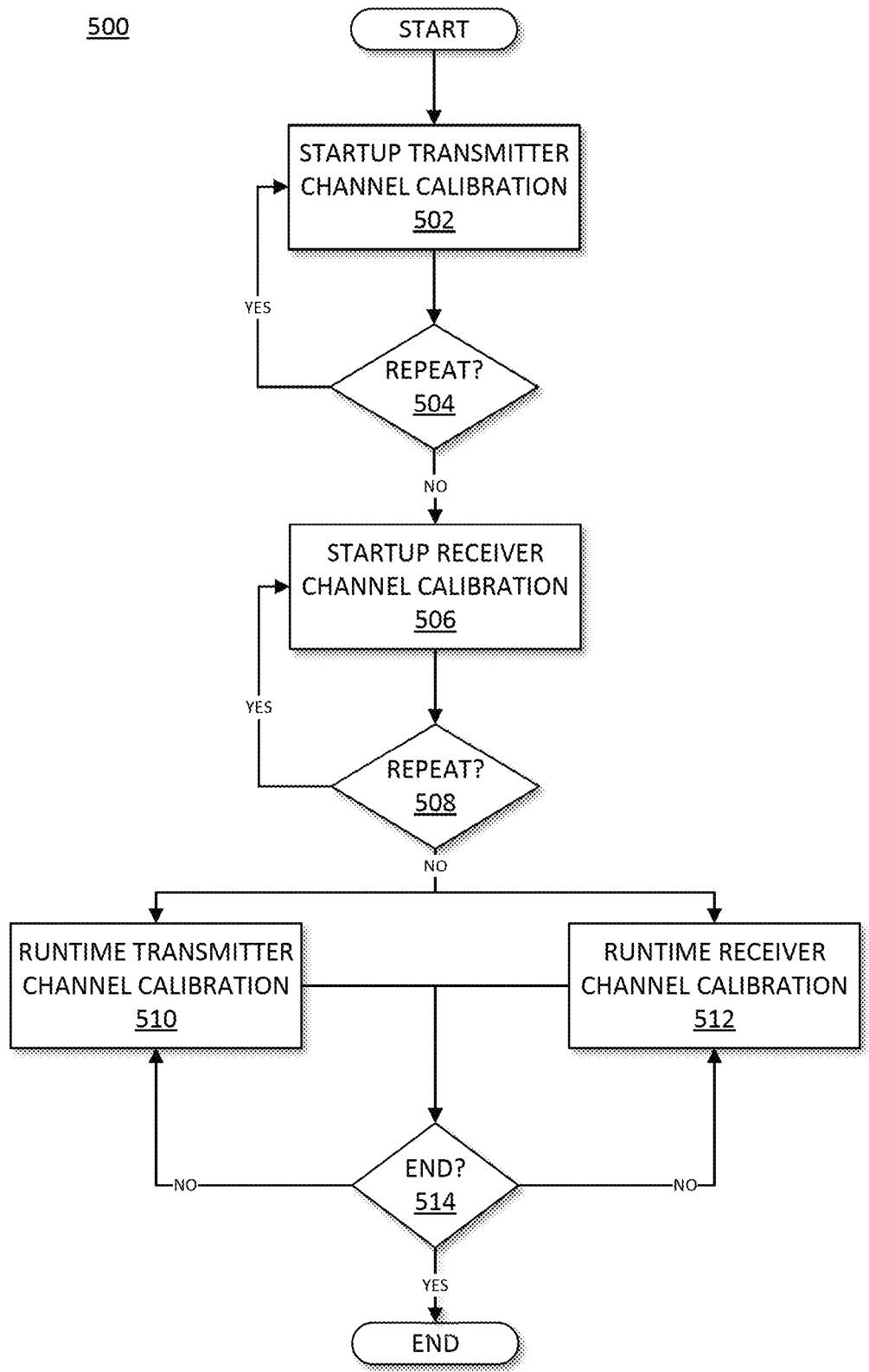
FIG. 5 is a flowchart showing an illustrative method for beamforming calibration, in accordance with an embodiment of the present disclosure.

FIG. 5 is a flowchart showing an illustrative method 500 for performing beamforming calibration using the system 100, in accordance with an embodiment of the present disclosure. In general, the various types of calibration techniques described herein calibrate signals transmitted and/or received via the transmitter and receiver channels of the system 100 to equalize three signal characteristics—gain (or magnitude), phase, and timing (or delay) across channels. More particularly, the three effects that are estimated by way of the calibration techniques described herein include (1) gain differences between the channels (for instance, relative gain differences between the transmitter channels or relative gain differences between the receiver channels), (2) phase differences between the channels (for instance, relative phase differences between the transmitter channels or relative phase differences between the receiver channels), and (3) timing differences or delays between the chains (for instance, relative timing differences between the transmitter channels or relative timing differences between the receiver channels). The calibration techniques described herein measure each of these signal characteristics across the channels and selectively implement adjustments to equalize the transmitted and received signals to cancel out or mitigate differences across the channels, which may have various systemic and/or environmental causes. To that end, the method 500 generally includes two types of calibration—startup calibration and runtime calibration. Startup calibration is executed during startup or while the system 100 is booting up, and runtime calibration is executed while the system 100 is running, i.e., while the system 100 is transmitting and receiving data signals via the antenna array 108, for instance, to provide a communication service such as LTE service to a subscriber area. In some embodiments, startup calibration is executed to estimate timing (or delay) variation and coarse phase and gain changes, and runtime calibration is executed to capture minor changes, such as changes in phase and gain, for example, due to temperature variation. In some instances, no change in timing is expected at runtime, and only small changes in phase and gain are expected, so a relatively narrow window of estimation may be employed during runtime calibration.

With reference to FIG. 5, at block 502 a startup transmitter channel calibration algorithm is executed to calibrate the transmitter channels of the system 100. Further details regarding examples of startup transmitter channel calibration algorithms that may be employed at block 502 are provided below. In general, the startup transmitter channel calibration algorithms perform measurements of calibration signals propagated through the transmitter channels of the system 100 and identify adjustments, if any, to be made to data signals subsequently transmitted via the transmitter channels to equalize those data signals.

In some embodiments, the startup transmitter channel calibration algorithm at block 502 is executed only once upon startup of the system 100. In other embodiments, the startup transmitter channel calibration algorithm is executed once and then is executed one or more additional times to confirm that the adjustments made as a result of prior executions of the algorithm are successful in equalizing the signals across the transmitter channels. In this regard, success may be defined based upon particular thresholds of relative differences in gain, phase, and timing across channels that are predetermined to be acceptable. In some embodiments, by way of example and not limitation, a relative gain difference of within ±0.25 dB across channels and across an operation frequency band is predetermined to be acceptable, a relative phase difference of within ±4 degrees across channels and across the operational frequency band is predetermined to be acceptable, and a relative time difference of 0.5 ns across channels and across the operational frequency band is predetermined to be acceptable.

At block 504, the calibration module 106 determines whether to repeat the startup transmitter channel calibration algorithm at block 502. If the calibration module 106 determines at block 504 to repeat the startup transmitter channel calibration algorithm ("YES" at block 504), then control returns to block 504 to repeat the startup transmitter channel calibration algorithm and potentially determine more accurate adjustments to be made for signal equalization of signals subsequently transmitted via the transmitter channels. Repeating the startup transmitter channel calibration algorithm one or more times upon startup may thus improve the accuracy of signal equalization across the transmitter channels of the system 100.

If the calibration module 106 determines at block 504 not to repeat the startup transmitter channel calibration ("NO" at block 504), then control proceeds to block 506 to execute a startup receiver channel calibration algorithm to calibrate the receiver channels of the system 100. Although not depicted in FIG. 5, in some embodiments, the startup transmitter channel calibration algorithm of block 502 and the startup receiver channel calibration algorithm of block 506 are executed simultaneously in parallel, thereby reducing total startup time. Further details regarding examples of startup receiver channel calibration algorithms that may be employed at block 506 are provided below. In general, the startup receiver channel calibration algorithms perform measurements of calibration signals propagated through the receiver channels of the system 100 and identify adjustments, if any, to be made to data signals subsequently received via the receiver channels to equalize those data signals.

At block 508, the calibration module 106 determines whether to repeat the startup receiver channel calibration algorithm at block 506. If the calibration module 106 determines at block 508 to repeat the startup receiver channel calibration ("YES" at block 508), then control returns to block 506 to repeat the startup receiver channel calibration algorithm and potentially determine more accurate adjustments to be made for signal equalization. In some instances, repeating the startup receiver channel calibration algorithm one or more times upon startup improves the accuracy of signal equalization across receiver channels of the system 100.

If the calibration module 106 determines at block 508 not to repeat the startup receiver channel calibration ("NO" at block 508), then control proceeds to blocks 510 and 512 to concurrently execute a runtime transmitter channel calibration algorithm and a runtime receiver channel calibration, respectively, to calibrate the transmitter channels and receiver channels, respectively, of the system 100 during runtime. Further details regarding examples of runtime transmitter channel calibration algorithms and runtime receiver channel calibration algorithms that may be employed at blocks 510 and 512, respectively, are provided below. In general, the runtime transmitter and receiver channel calibration algorithms perform measurements of calibration signals propagated through the transmitter and receiver channels of the system 100 during runtime and identify adjustments, if any, to be made to data signals subsequently transmitted or received via the transmitter or receiver channels, respectively, to equalize those data signals during runtime. In this manner, variations among signal effects across transmitter and/or receiver channels of the system that may be caused by environmental factors during runtime may be mitigated.

At block 514, the calibration module 106 determines whether to terminate the beamforming calibration method 500, for instance, if the system 100 is placed in a standby mode, if calibration is disabled, and/or the like. If the calibration module 106 determines at block 514 to terminate the beamforming calibration method 500 ("YES" at block 514), then the calibration module 106 terminates the method 500. If the calibration module 106 determines at block 514 not to terminate the beamforming calibration method 500 ("NO" at block 514), then control passes back to blocks 510 and 512 to repeat the concurrent execution of the runtime transmitter channel calibration algorithm and the runtime receiver channel calibration, respectively, to calibrate the transmitter channels and receiver channels, respectively, of the system 100 during runtime.

Figure 6:
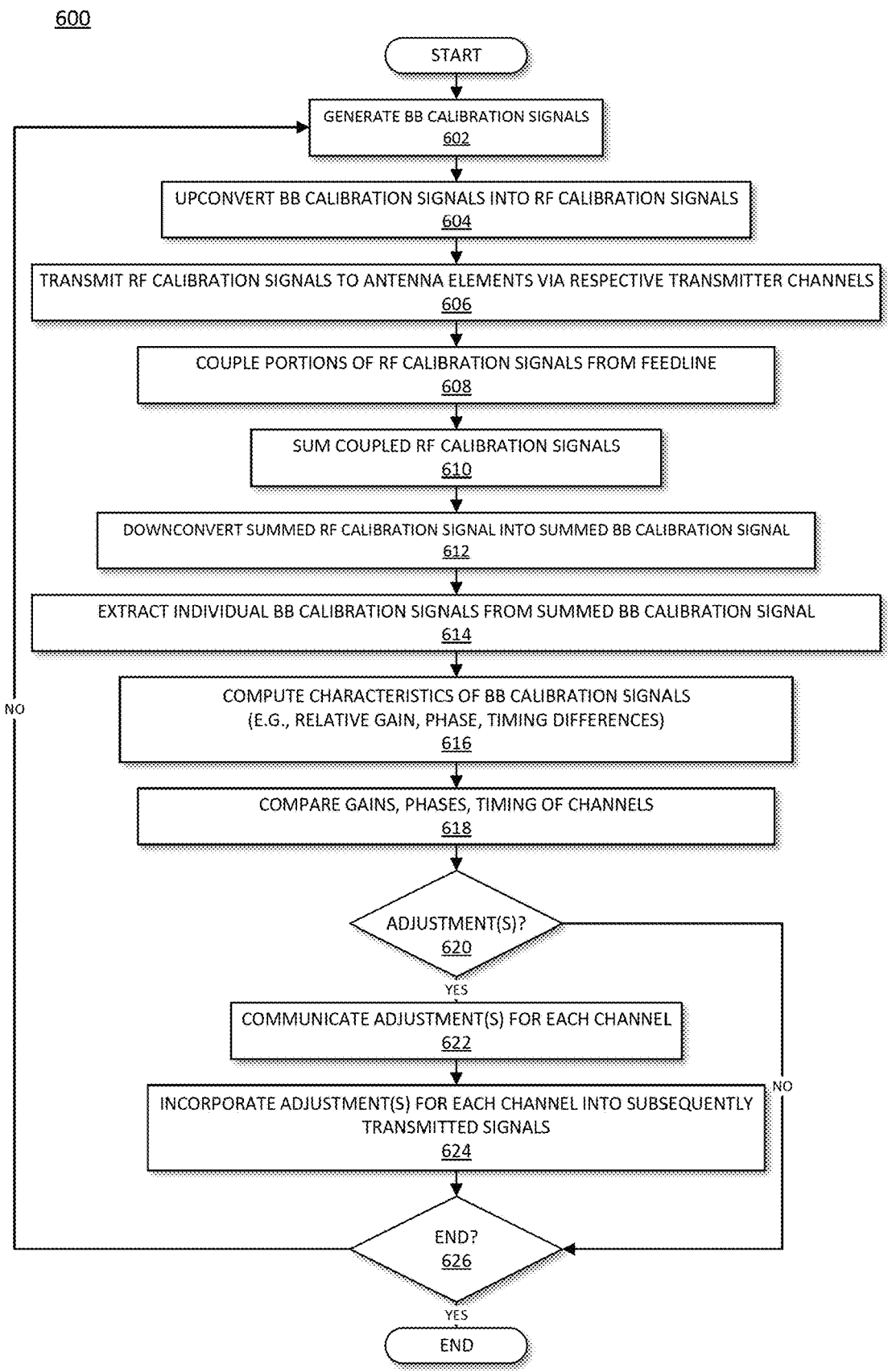
FIG. 6 is a flowchart showing an illustrative method for performing beamforming calibration of transmitter channels in a startup mode, in accordance with an embodiment of the present disclosure.

FIG. 6 is a flowchart showing an illustrative method 600 for performing beamforming calibration of transmitter channels of the system 100 in a startup mode, in accordance with an embodiment of the present disclosure. At block 602, the weighting and calibration processor 202 generates multiple baseband calibration signals for the multiple transmitter channels, respectively, of the system 100, and forwards the baseband calibration signals to the weighting matrix and calibration injection module 204 for propagation through the respective transmitter channels of the system 100. The weighting matrix and calibration injection module 204 forwards the baseband calibration signals to the respective transmitter channels of the transmitter and receiver module 104, which, at 604, upconvert the respective baseband calibration signals into respective RF calibration signals. At block 606, the transmitter channels of the transmitter and receiver module 104 transmit the RF calibration signals to the antenna elements, respectively, of the antenna array 108 for radiation into free space.

At block 608, portions of the RF calibration signals are coupled from the antenna feedlines, respectively, via respective RF couplers 210, and are forwarded to a combiner 212. At block 610, the combiner 212 combines the portions of the RF calibration signals into a summed RF calibration signal and forwards the summed RF calibration signal to the calibration receiver 206. Alternatively, as noted above in connection with FIG. 2, in some embodiments, instead of including the RF couplers 210 and the combiner 212, the coupling module 208 includes the calibration antenna element 214 that receives each of the EM signals transmitted from the transmitter channels of the transmitter and receiver module 104 via corresponding antenna elements of the antenna array 108 and converts the received EM signals into an RF signal that is provided to the calibration receiver module 206 for processing. At block 612, the calibration receiver 206 downconverts the summed RF calibration signal to a summed baseband calibration signal, and forwards the summed baseband calibration signal to the weighting and calibration processor 202.

At block 614, the weighting and calibration processor 202 extracts, from the summed baseband calibration signal, individual baseband calibration signals having propagated through the transmitter channels, respectively, of the system 100. In some embodiments, the summed baseband calibration signal includes multiple orthogonal individual calibration signals (such as Walsh-Hadamard sequences, Zadoff-Chu sequences, and/or the like) corresponding to the multiple transmitter channels, respectively, of the system 100. Because the individual calibration signals are orthogonal, the individual calibration signals may be extracted at block 614 from the summed baseband calibration signal by correlating the summed baseband calibration signal against each individual calibration signal, thereby generating respective correlation output signals for the multiple transmitter channels. In some cases, the individual calibration signals are transmitted via the system 100 one at a time in rapid succession, in which case orthogonality is achieved by virtue of the time separation between signals.

At block 616, the weighting and calibration processor 202 computes characteristics of the baseband calibration signals, such as gain, phase, timing differences among the calibration signals corresponding to the respective transmitter channels.

At block 618, the weighting and calibration processor 202 compares the gain, phase, and timing characteristics of the respective transmitter channels to each other to identify, quantify, and/or characterize relative differences in gain, phase, and timing across the transmitter channels. For example, in some embodiments the signal, among the respective correlation output signals of the transmitter channels, having the maximum peak is selected as a reference signal. For each transmitter channel: (1) the timing difference between the peak point in its correlation output signal and the peak point of the selected reference signal represents the timing difference for that transmitter channel; (2) the relative amplitude difference between the peak point in its correlation output signal and the peak point of the selected reference signal represents the gain difference for that transmitter channel; and (3) the relative phase difference between its correlation output signal and the reference signal represents the phase difference.

At block 620, the weighting and calibration processor 202 determines, based upon the results of the comparing at block 618, whether any adjustments are to be made to the gain, phase, or timing of each of the transmitter channels to equalize signals subsequently transmitted via the transmitter channels. As described above, the determination at block 620 may be based at least in part upon one or more thresholds of differences in gain, phase, or timing that are predetermined to be acceptable. In some embodiments, two types of timing adjustments are determined at block 620— one type of timing adjustment that is determined based on a sampling time error and another type of timing adjustment that is determined based on a static one-time timing error between two paths. If the weighting and calibration processor 202 determines at block 620 that no adjustments are to be made to the gain, phase, or timing of each of the transmitter channels to equalize signals subsequently transmitted via the transmitter channels ("NO" at block 620), then control passes to block 626 to determine whether to terminate the calibration method 600 as described below. If, on the other hand, the weighting and calibration processor 202 determines at block 620 that one or more adjustments are to be made to the gain, phase, or timing of one or more of the transmitter channels to equalize signals subsequently transmitted via the transmitter channels ("YES" at block 620), then control passes to block 622.

At block 622, the weighting and calibration processor 202 communicates to the weighting matrix and calibration injection module 204 the adjustments that were identified at block 620 for one or more of the transmitter channels of the system 100. At block 624, the weighting matrix and calibration injection module 204 configures the transmitter channels to incorporate their respective adjustments (if any, as the case may be for each transmitter channel) into signals (for example, data signals) that are subsequently transmitted via the transmitter channels, respectively. Control then passes to block 626.

At block 626, the calibration module 106 determines whether to terminate the startup transmitter channel beamforming calibration method 600, for instance, if the system 100 is placed in a standby mode, if calibration is disabled, if the system 100 is preconfigured to execute the method 600 only once upon startup, and/or the like. If the calibration module 106 determines at block 626 to terminate the startup transmitter channel beamforming calibration method 600 ("YES" at block 626), then the calibration module 106 terminates the method 600. If the calibration module 106 determines at block 626 not to terminate the startup transmitter channel beamforming calibration method 600 ("NO"

at block 626), then control passes back to block 602 to repeat the startup transmitter channel beamforming calibration method 600 in the manner described above.

Figure 7:
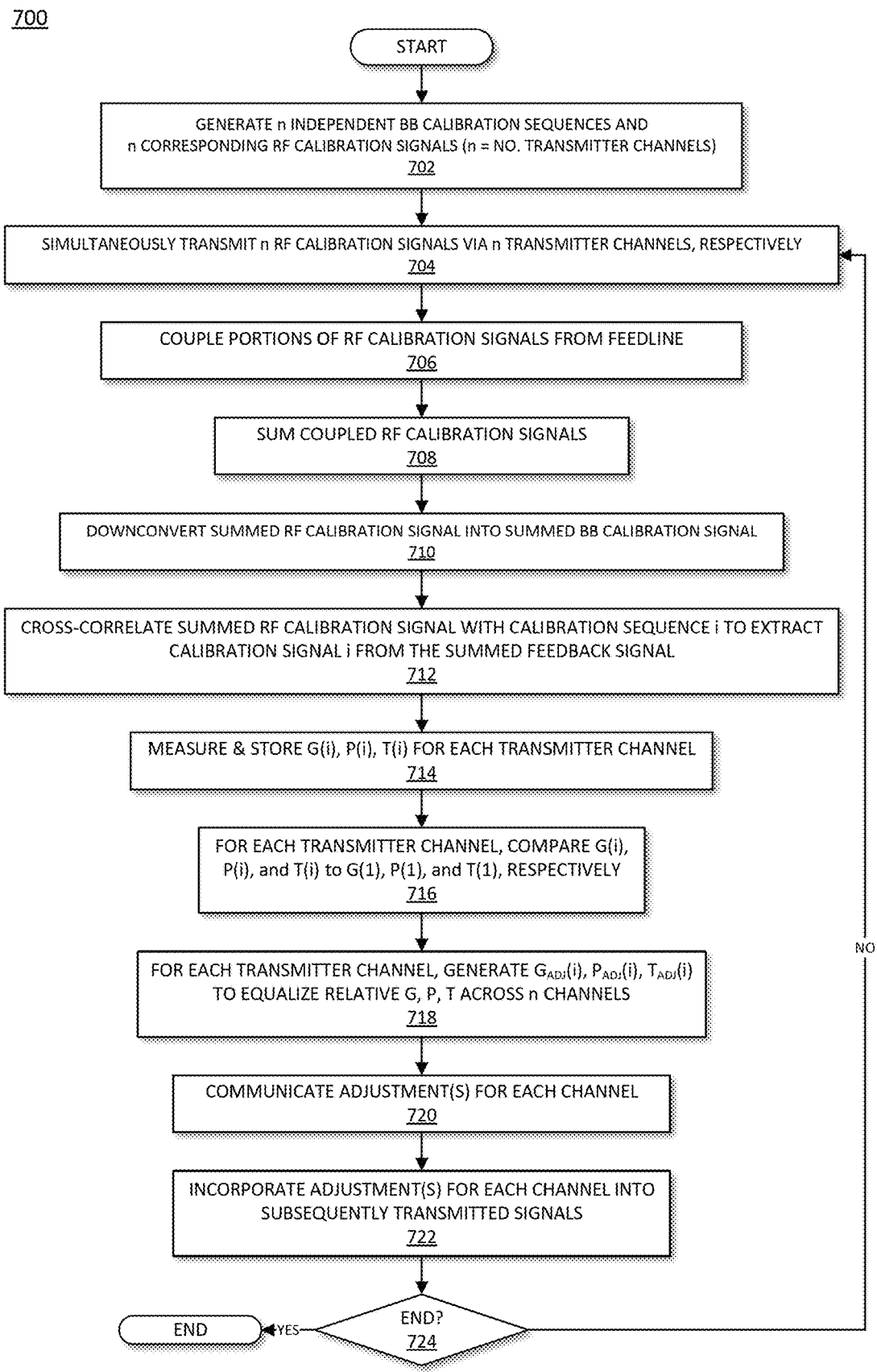
FIG. 7 is a flowchart showing an illustrative method for performing beamforming calibration of transmitter channels in a startup mode, in accordance with an embodiment of the present disclosure.

FIG. 7 is a flowchart showing another illustrative method 700 for performing beamforming calibration of transmitter channels of the system 100 in a startup mode, in accordance with an embodiment of the present disclosure. At block 702, the weighting and calibration processor 202 generates multiple (specifically, n, where n represents the number of transmitter channels of the system 100) independent calibration sequences for the multiple transmitter channels, respectively, of the system 100, and generates n baseband calibration signals based on the n calibration sequences, respectively. The weighting and calibration processor 202 then forwards the n baseband calibration signals to the weighting matrix and calibration injection module 204 for propagation through the respective transmitter channels of the system 100.

In some embodiments, the transmitter channels of the system 100 are calibrated one at a time relative to the other transmitter channel(s), with portions of the procedure 700 being repeated for each transmitter channel calibration. In other embodiments, the transmitter channels of the system 100 are calibrated in parallel using a single transmit event.

At block 704, the weighting matrix and calibration injection module 204 forwards the baseband calibration signals to the respective transmitter channels of the transmitter and receiver module 104, which upconvert the respective baseband calibration signals into respective RF calibration signals, and transmit the RF calibration signals to the antenna elements, respectively, of the antenna array 108 for radiation into free space.

At block 706, portions of the RF calibration signals are coupled from the antenna feedlines, respectively, via respective RF couplers 210, and are forwarded to the combiner 212. At block 708, the combiner 212 combines the portions of the RF calibration signals into a summed RF calibration signal and forwards the summed RF calibration signal to the calibration receiver 206. Alternatively, as noted above in connection with FIG. 2, in some embodiments, instead of including the RF couplers 210 and the combiner 212, the coupling module 208 includes the calibration antenna element 214 that receives each of the EM signals transmitted from the transmitter channels of the transmitter and receiver module 104 via corresponding antenna elements of the antenna array 108 and converts the received EM signals into an RF signal that is provided to the calibration receiver module 206 for processing. At block 710, the calibration receiver 206 downconverts the summed RF calibration signal to a summed baseband calibration signal, and forwards the summed baseband calibration signal to the weighting and calibration processor 202.

At block 712, the weighting and calibration processor 202 extracts, from the summed baseband calibration signal, individual baseband calibration signals having propagated through the transmitter channels, respectively, of the system 100. In some examples, the weighting and calibration processor 202 performs the extraction at block 712 by cross-correlating the summed RF calibration signal that was generated at block 710 with the particular one of the calibration sequences (for instance, calibration sequence i of n) that was generated at block 702 and that corresponds to the particular transmitter channel being calibrated at this stage of the procedure 700. More specifically, in some embodiments the extraction at block 712 is performed in a manner similar to that described above in connection with block 614 (FIG. 6). At block 714, the weighting and calibration processor 202 computes characteristics of the baseband calibration signals, such as gain, phase, timing differences among the calibration signals corresponding to the respective transmitter channels. The computation at block 714, in some examples, is performed in a manner similar to that described above in connection with block 616 (FIG. 6).

At block 716, the weighting and calibration processor 202 compares the calibration signal gain, phase, and timing measured at block 714 for each transmitter channel against the calibration signal gain, phase, and timing measured at block 714 for transmitter channel 1, which, in this example, serves as the baseline against which all other transmitter channels are compared. In this manner, the weighting and calibration processor 202 identifies, quantifies, and/or characterizes relative differences in gain, phase, and timing across transmitter channels.

At block 718, the weighting and calibration processor 202 generates, based upon the results of the comparing at block 716, any adjustments to be made to the gain, phase, or timing of each transmitter channel to equalize signals subsequently transmitted via each transmitter channel. As described above, the adjustments generated at block 718 may be generated based at least in part upon one or more thresholds of differences in gain, phase, or timing that are predetermined to be acceptable. In some embodiments, two types of timing adjustments are determined at block 718—one type of timing adjustment that is determined based on a sampling time error and another type of timing adjustment that is determined based on a static one-time timing error between two paths.

At block 720, the weighting and calibration processor 202 communicates to the weighting matrix and calibration injection module 204 the respective adjustments that were generated at block 718 for the transmitter channels of the system 100. At block 722, the weighting matrix and calibration injection module 204 configures the transmitter channels to incorporate their respective adjustments (if any, as the case may be for the various transmitter channels) into signals (for example, data signals) that are subsequently transmitted via those transmitter channels, respectively. Control then passes to block 724.

At block 724, the calibration module 106 determines whether to terminate the startup transmitter channel beamforming calibration method 700, for instance, if the system 100 is placed in a standby mode, if calibration is disabled, if the system 100 is preconfigured to execute the method 700 only once upon startup, and/or the like. If the calibration module 106 determines at block 724 to terminate the startup transmitter channel beamforming calibration method 700 ("YES" at block 724), then the calibration module 106 terminates the method 700. If the calibration module 106 determines at block 724 not to terminate the startup transmitter channel beamforming calibration method 700 ("NO" at block 724), then control passes back to block 706 to repeat the startup transmitter channel beamforming calibration method 700 in the manner described above.

Figure 8:
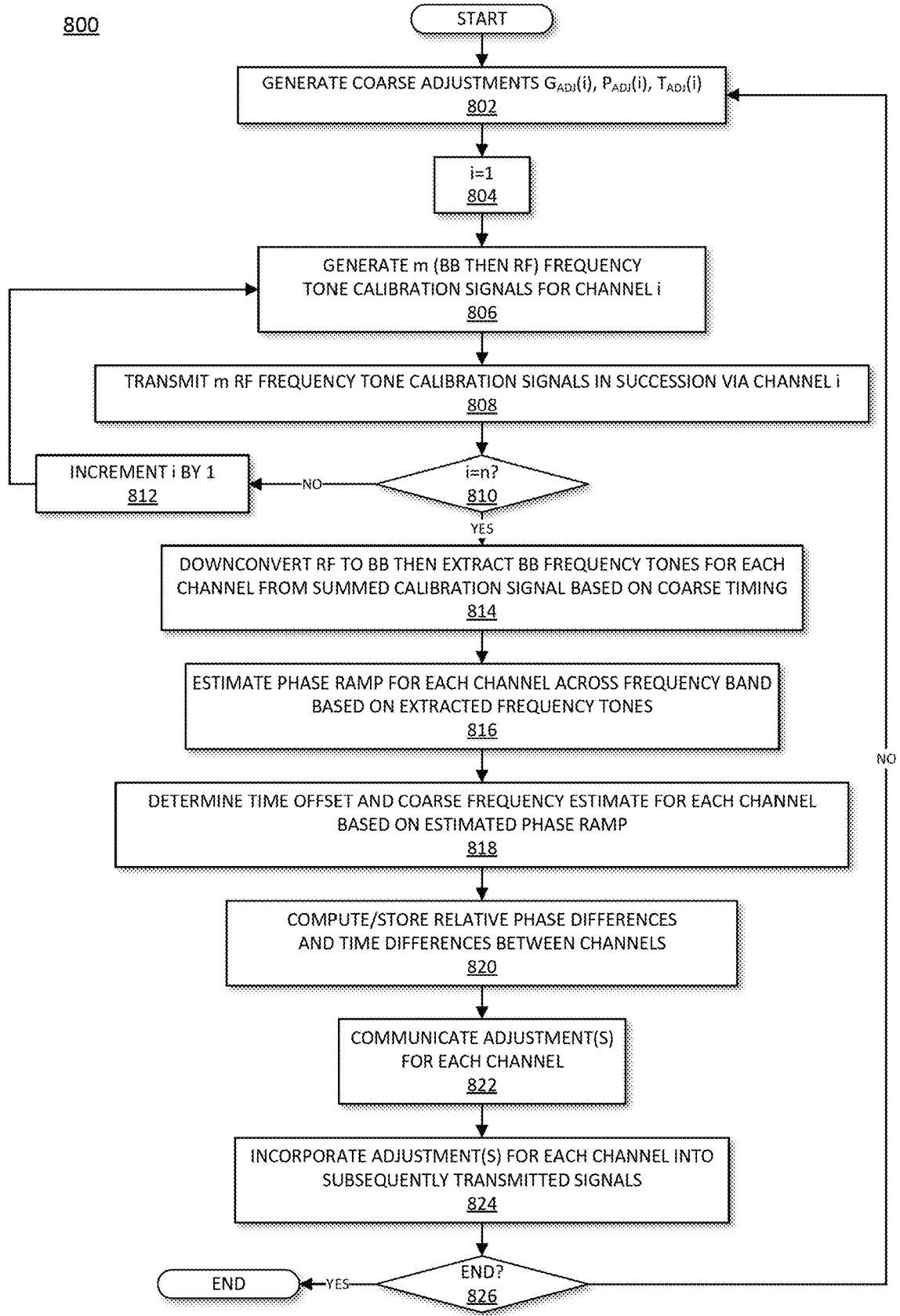
FIG. 8 is a flowchart showing an illustrative method for performing beamforming calibration of transmitter channels in a startup mode, in accordance with another embodiment of the present disclosure.

FIG. 8 is a flowchart showing another illustrative method 800 for performing beamforming calibration of transmitter channels of the system 100 in a startup mode, in accordance with another embodiment of the present disclosure. Before describing the calibration method 800 in detail, an overview will be provided. Beamforming relies upon phasing multiple RF signals to multiple antennas to manipulate the gain pattern of the array, thereby sending the electromagnetic energy in a certain direction. In some instances, narrowband signals can be treated as a single frequency with a single wavelength. For such narrowband signals, time (or propagation) delay is equivalent to phase delay, and one can be used to correct the other. For example, if a longer cable introduces a propagation delay of ±¼ wavelength, this can be corrected by applying a phase offset of −90° on that signal. However, for wideband signals where the frequency content is ±BW/2, where BW represents the operational frequency bandwidth, there are a range of wavelengths present in the signal. A single cable propagation delay for wideband signals is experienced differently for each wavelength. For instance, shorter wavelengths experience more phase change, while longer wavelengths experience comparatively less phase change. A time delay thus applies a phase ramp on frequencies in a wideband signal, which cannot be totally corrected2 with a single phase offset applied elsewhere in the system. As described in further detail below, to ensure beamforming is effective across all frequencies in a wideband signal, the calibration method 800 facilitates equalization of time delay across all RF paths to within a margin of error.

Referring now to FIG. 8, at block 802, the calibration module 106 generates coarse gain, phase, and timing adjustments for each transmitter channel of the system 100, for example, by executing one or more iterations of the method 700 described above. As described in further detail below, in the procedure 800, the transmitter channels of the system 100 are calibrated one at a time relative to the other transmitter channel(s), with portions of the procedure 800 being repeated for each transmitter channel calibration. To that end, an index i is used to represent the particular transmitter channel being calibrated at a particular stage of the procedure 800. At block 804, the weighting and calibration processor 202 initializes the index i by setting i equal to 1, corresponding to the first transmitter channel being calibrated.

At block 806, the weighting and calibration processor 202 generates multiple (specifically, m, where m is an integer that represents the number of discrete frequency tones used to perform calibration at various frequencies across an operational frequency band) baseband frequency tone calibration signals for the transmitter channel i of the system 100. The weighting and calibration processor 202 then forwards the m baseband frequency tone calibration signals to the weighting matrix and calibration injection module 204 for propagation through the transmitter channel i being calibrated at this iteration.

At block 808, the weighting matrix and calibration injection module 204 forwards the baseband frequency tone calibration signals to the respective transmitter channel of the transmitter and receiver module 104, which upconverts the respective baseband calibration signals into respective RF frequency tone calibration signals, and transmits in succession each of the RF frequency tone calibration signals to the respective antenna element of the antenna array 108 for radiation into free space.

At block 810, the weighting and calibration processor 202 determines whether the index i is equivalent to the number of transmitter channels n of the system 100. If the weighting and calibration processor 202 determines at block 810 that the index i is not equivalent to the number of transmitter channels n of the system 100 ("NO" at block 810), then at block 812 the index i is incremented by 1 and control passes back to block 806 to calibrate the next transmitter channel in the manner described above. If, on the other hand, the weighting and calibration processor 202 determines at block 810 that the index i is equivalent to the number of transmitter channels n of the system 100 ("YES" at block 810), then control passes to block 814.

At block 814, the calibration receiver 206 receives a summed RF calibration signal of the frequency tones from the transmitter channels of the system 100 by way of the RF couplers 210 and the combiner 212, or by way of the antenna elements of the antenna array 108 and the calibration antenna element 214. The calibration receiver 206 then downconverts the summed RF calibration signal of frequency tones to a summed baseband calibration signal of frequency tones, extracts the individual baseband frequency tone calibration signals from the summed baseband calibration signal of frequency tones, and forwards the extracted baseband frequency tone calibration signals to the weighting and calibration processor 202. At block 816, based on the baseband frequency tone calibration signals extracted at block 814, the weighting and calibration processor 202 estimates a phase ramp for each transmitter channel across the operational frequency band.

At block 818, the weighting and calibration processor 202 determines, based on the phase ramps estimated for the respective transmitter channels, a time offset and a coarse frequency estimate for each transmitter channel. At block 820, the weighting and calibration processor 202 computes and stores relative phase differences and relative time differences between the channels. The weighting and calibration processor 202, at block 822, generates, based at least in part upon the phase differences and time differences computed at block 820, any adjustments to be made to the gain, phase, or timing of the transmitter channels to equalize signals subsequently transmitted via those transmitter channels. As described above, the adjustments generated at block 822 may be generated based at least in part upon one or more thresholds of differences in gain, phase, or timing that are predetermined to be acceptable. The weighting and calibration processor 202 communicates to the weighting matrix and calibration injection module 204 the respective adjustments that may have been generated for the transmitter channels of the system 100. At block 824, the weighting matrix and calibration injection module 204 configures the transmitter channels to incorporate their respective adjustments (if any, as the case may be for the various transmitter channels) into signals (for example, data signals) that are subsequently transmitted via those transmitter channels, respectively. Control then passes to block 826.

At block 826, the calibration module 106 determines whether to terminate the startup transmitter channel beamforming calibration method 800, for instance, if the system 100 is placed in a standby mode, if calibration is disabled, if the system 100 is preconfigured to execute the method 800 only once upon startup, and/or the like. If the calibration module 106 determines at block 826 to terminate the startup transmitter channel beamforming calibration method 800 ("YES" at block 826), then the calibration module 106 terminates the method 800. If the calibration module 106 determines at block 826 not to terminate the startup transmitter channel beamforming calibration method 700 ("NO" at block 826), then control passes back to block 802 to repeat the startup transmitter channel beamforming calibration method 800 in the manner described above.

Figure 9:
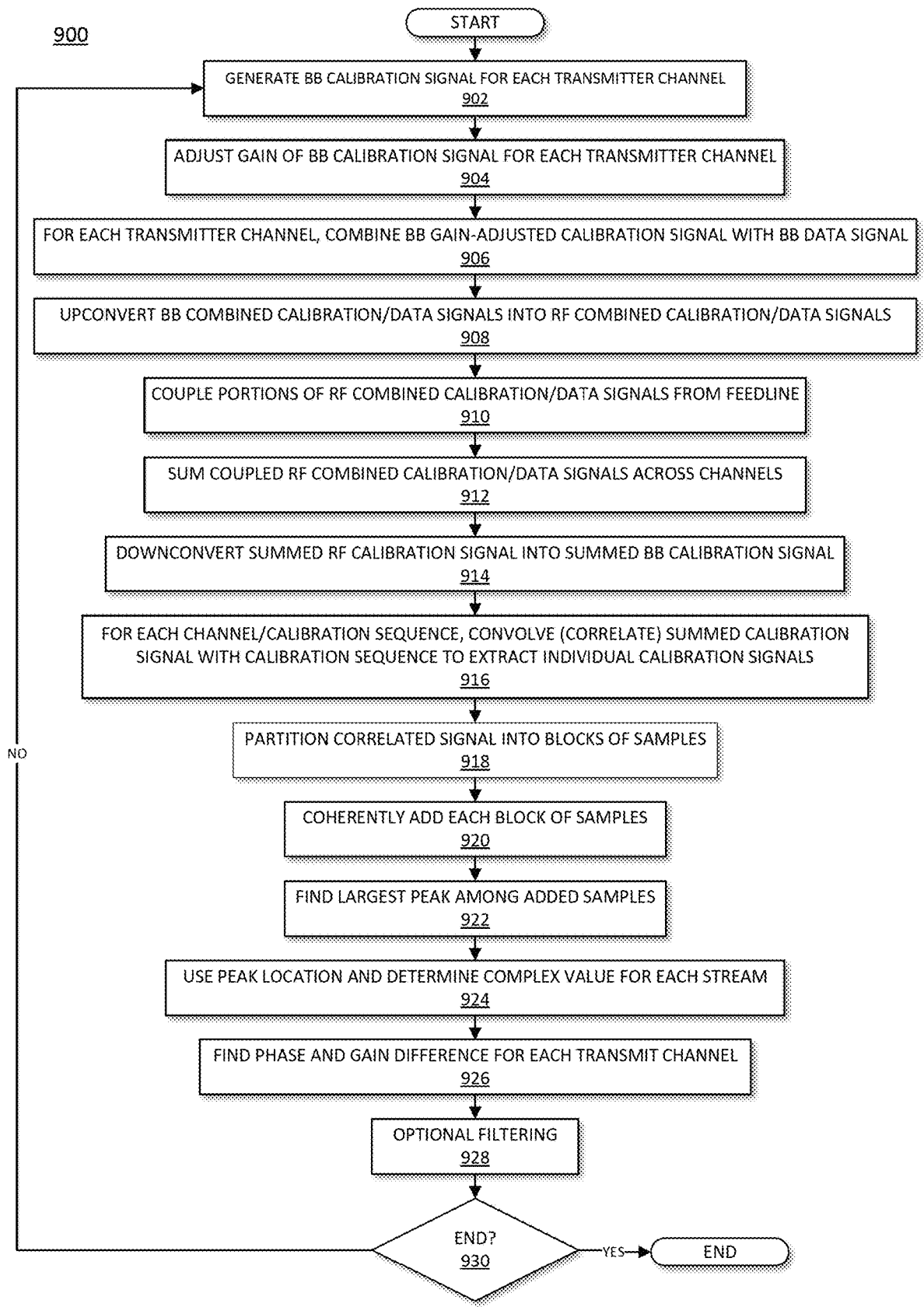
FIG. 9 is a flowchart showing an illustrative method for performing beamforming calibration of transmitter channels in a runtime mode, in accordance with an embodiment of the present disclosure.

FIG. 9 is a flowchart showing an illustrative method 900 for performing beamforming calibration of transmitter channels of the system 100 in a runtime mode, in accordance with an embodiment of the present disclosure. Before describing the method 900 in detail, a general description will be provided. The method 900 generally includes applying a known test stimulus to the system 100 and subsequently observing the performance of the system in response to the stimulus. The calibration method 900 is executed during runtime, and various techniques are contemplated for use in the method 900 in how to perform calibration without disturbing the continuous uninterrupted radio operation of the system 100. For instance, runtime calibration may involve (1) using a direct current (DC) subcarrier, (2), using an out-of-band carrier, or (3) using a low-amplitude carrier with coding gain extraction.

Runtime calibration using a DC subcarrier makes use of a region around the center RF frequency (the DC subcarrier, as seen by the baseband), which is unused for data service due to various artifacts introduced in that frequency region by the radio electronics. With this approach, which involves rejecting the artifacts, modest signal amplitudes applied in the DC subcarrier are ignored by the communication system, making this region attractive for calibration use. Runtime calibration using an out-of-band carrier makes use of the fact that band filtering imposed by the signal chain in radio communication systems is larger, if only slightly, than the actual bandwidth of the communications. The unused gap between the filtered bandwidth and the utilized bandwidth is used for calibration. Runtime calibration using a low-amplitude carrier with coding gain extraction makes use of the fact that radio communication systems are engineered to operate in the presence of noise. The calibration signal is introduced that, to conventional systems, appears to be noise, so ordinary communication operation is unaffected or only minimally affected. To counter the noisiness of the result of the calibration transmission, a coded sequence is used as the calibration signal, and coding gain (correlation) is used to extract the signal out of the noise. Additional details of runtime calibration using the low-amplitude carrier with coding gain extraction are provided below in connection with FIG. 9.

Various types of calibration signals or sequences may be employed for implementing runtime calibration using low-amplitude carrier with coding gain extraction. For instance, calibration signals suitable for this purpose may have certain characteristics, namely: (1) a cyclic or period code which is naturally periodic or made cyclic through truncation, (2), low or zero autocorrelation for measuring timing alignment, (3) multiple orthogonal bases, whereby the code allows for bases or seeds which produce multiple codes with the same characteristics but low cross-correlation between them (this may be used to create unique stimuli for each transmission path while allowing them to be cleanly differentiated from each other), and (4) constant amplitude, (for instance, over a short term average), to avoid generation of potentially problematic structure noise for the communication system in either a time domain or a frequency domain. Exemplary types of signals that are suitable for such calibration include orthogonal signals, constant amplitude zero autocorrelation (CAZAC) codes, Zadoff-Chu sequences, Walsh-Hadamard sequences, and/or the like.

At block 902, the weighting and calibration processor 202 generates a baseband calibration signal for each of the transmitter channels of the system 100. In some embodiments, the baseband calibration signals are Zadoff-Chu (ZC) sequences and each baseband calibration signal has a length equal to a length of an LTE symbol including a cyclic prefix.

At block 904, the weighting and calibration processor 202 adjusts the respective gains of the baseband calibration signals for the transmitter channels. In some embodiments, the gain adjustments at block 904 are used to adjust the amplitude of the calibration signals relative to a data signal, such as an LTE signal, with which the calibration signals are to be combined. In this manner, the calibration signal may be adjusted to have an amplitude that is buried below a noise threshold of the data signal (for example, 20 dB lower than the data signal), such that conventional user equipment receiving the signal does not detect the calibration signal. The calibration signal appears to be noise to conventional user equipment. In some embodiments, the amplitude of the calibration signal may be increased at block 904, which may enable runtime calibration to execute more quickly, at the cost of increasing the noise level.

At block 906, the weighting and calibration processor 202 combines the baseband gain-adjusted calibration signals with corresponding baseband data signals for each of the transmitter channels of the system 100. At block 908, each transmitter channel of the system 100 upconverts its corresponding baseband combined data and calibration signals into an RF combined data and calibration signal.

At block 910, portions of the RF combined data and calibration signals of the transmitter channels are coupled from the antenna feedlines, respectively, via respective RF couplers 210, and are forwarded to a combiner 212, which, at block 912 combines the portions of the RF combined data and calibration signals into a summed RF combined data and calibration signal and forwards the summed RF combined data and calibration signal to the calibration receiver 206. Alternatively, as noted above in connection with FIG. 2, in some embodiments, instead of including the RF couplers 210 and the combiner 212, the coupling module 208 includes the calibration antenna element 214 that receives each of the EM signals transmitted from the transmitter channels of the transmitter and receiver module 104 via corresponding antenna elements of the antenna array 108 and converts the received EM signals into an RF signal that is provided to the calibration receiver module 206 for processing.

At block 914, the calibration receiver 206 downconverts the summed RF combined data and calibration signal to a summed baseband combined data and calibration signal, and forwards the summed baseband combined data and calibration signal to the weighting and calibration processor 202. At block 916, for each of the transmitter channels, the weighting and calibration processor 202 convolves (correlates) the summed baseband combined data and calibration signal with the calibration sequence generated for that transmitter channel at block 902 to extract individual calibration signals for each transmitter channel. At block 918, for each transmitter channel, the weighting and calibration processor 202 partitions each correlated signal from block 916 into blocks of samples. At block 920, the weighting and calibration processor 202 coherently adds the blocks of samples generated at block 918, effectively generating an average of the samples. In this manner, at block 920, n averaged correlation sequences are generated, one for each transmitter channel.

At block 922, the weighting and calibration processor 202 measures and stores, for each of the n correlation sequences obtained at block 920, the peak magnitudes of the correlation sequence. At block 924, the weighting and calibration processor 202, for each of the n correlation sequences, identifies a location within the sequence at which the peak is located and generates one complex value representing that peak. At block 926, the weighting and calibration processor 202 finds a gain difference and phase difference for each transmitter channel based on the complex value generated at block 924 for that transmitter channel. At block 928, the weighting and calibration processor 202 performs an optional filtering step. Control then passes to block 930.

At block 930, the calibration module 106 determines whether to terminate the runtime transmitter channel beamforming calibration method 900, for instance, if the system 100 is placed in a standby mode, if calibration is disabled, and/or the like. If the calibration module 106 determines at block 930 to terminate the startup transmitter channel beamforming calibration method 900 ("YES" at block 930), then the calibration module 106 terminates the method 900. If the calibration module 106 determines at block 930 not to terminate the startup transmitter channel beamforming calibration method 900 ("NO" at block 930), then control passes back to block 902 to repeat the runtime transmitter channel beamforming calibration method 900 in the manner described above.

Figure 10:
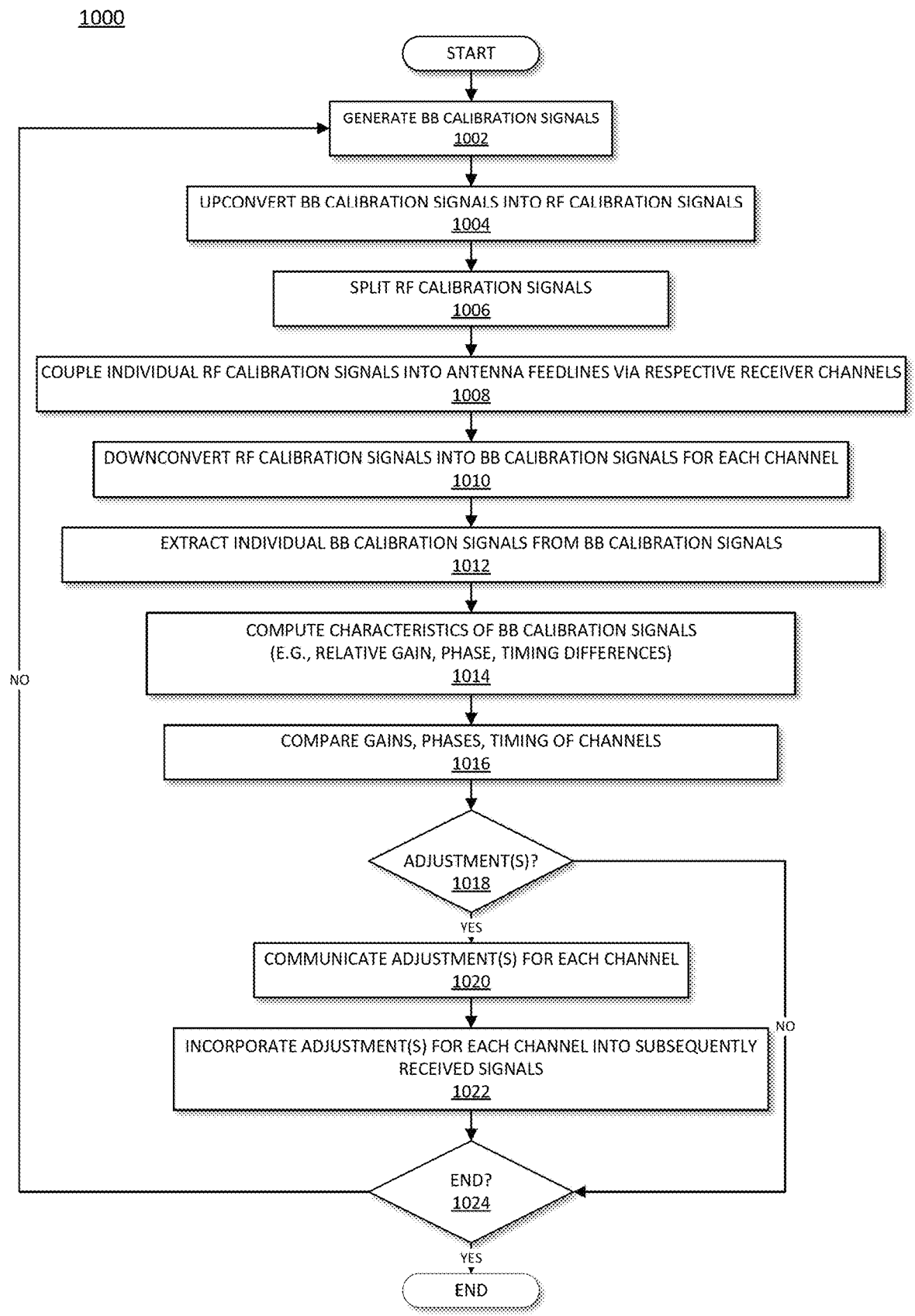
FIG. 10 is a flowchart showing an illustrative method for performing beamforming calibration of receiver channels in a startup mode, in accordance with an embodiment of the present disclosure.

Having described various illustrative methods for performing beamforming calibration of transmitter channels of the system 100, reference will now be made to FIG. 10 to describe an example method 1000 for performing beamforming calibration of receiver channels of the system 100 in a startup mode, in accordance with an embodiment of the present disclosure. At block 1002, the weighting and calibration processor 202 generates a baseband calibration signal to be used to calibrate the multiple receiver channels of the system 100, and forwards the baseband calibration signal to the calibration transmitter 306 for propagation through the respective receiver channels of the system 100. At block 1004, the calibration transmitter 306 upconverts the baseband calibration signal into a corresponding RF calibration signal, and forwards the RF calibration signal to the splitter 312, which, at block 1006, splits the RF calibration signal and provides the split versions of the RF calibration signal to the RF couplers 310 of the receiver channels of the system 100.

At block 1008, the RF calibration signals are directionally coupled into the antenna feedlines for the respective receiver channels by way of the RF couplers 310. In some embodiments, the RF couplers 310 are positioned within a predetermined distance from the antenna elements of the antenna array 108 to maximize the portions of the signal chains that are included in the feedback loop and facilitate more accurate calibration. Alternatively, as noted above in connection with FIG. 2, in some embodiments, instead of including the RF couplers 310 and the combiner 312, the injection module 308 includes the calibration antenna element 314 that is positioned within a predetermined distance from the antenna array 108. The calibration antenna element 314 receives the RF calibration signal from the calibration transmitter module 306, converts the RF calibration signal into a corresponding EM calibration signal, and transmits the EM calibration signal to the receiver channels of the transmitter and receiver module 104 via corresponding antenna elements of the antenna array 108. At block 1010, each receiver of the transmitter and receiver module 104 downconverts the RF calibration signal to a baseband calibration signal, and forwards the baseband calibration signal to the weighting matrix and calibration pickup module 304 for processing.

At block 1012, the weighting matrix and calibration pickup module 304 extracts, from the baseband calibration signal, individual baseband calibration signals having propagated through the receiver channels, respectively, of the system 100, and provides the extracted individual baseband calibration signals to the weighting and calibration processor 302 for processing. In some embodiments the extraction at block 1012 is performed in a manner similar to that described above in connection with block 614 (FIG. 6). At block 1014, the weighting and calibration processor 302 computes characteristics of the baseband calibration signals, such as gain, phase, timing differences among the calibration signals corresponding to the respective receiver channels. At block 1016, the weighting and calibration processor 302 compares the gain, phase, and timing characteristics of the respective receiver channels to each other to identify, quantify, and/or characterize relative differences in gain, phase, and timing across the receiver channels. The computation at block 1014 and/or the comparison or determination at block 1016, in some examples, are performed in a manner similar to that described above in connection with block 616 (FIG. 6).

At block 1018, the weighting and calibration processor 302 determines, based upon the results of the comparing at block 1016, whether any adjustments are to be made to the gain, phase, or timing of each of the receiver channels to equalize signals subsequently received via the receiver channels. As described above, the determination at block 1018 may be based at least in part upon one or more thresholds of differences in gain, phase, or timing that are predetermined to be acceptable. If the weighting and calibration processor 302 determines at block 1018 that no adjustments are to be made to the gain, phase, or timing of each of the receiver channels to equalize signals subsequently receiver via the transmitter channels ("NO" at block 1018), then control passes to block 1024 to determine whether to terminate the calibration method 1000 as described below. If, on the other hand, the weighting and calibration processor 302 determines at block 1018 that one or more adjustments are to be made to the gain, phase, or timing of one or more of the receiver channels to equalize signals subsequently received via the receiver channels ("YES" at block 1018), then control passes to block 1020.

At block 1020, the weighting and calibration processor 302 communicates to the weighting matrix and calibration pickup module 304 the adjustments that were identified at block 1018 for one or more of the receiver channels of the system 100. At block 1022, the weighting matrix and calibration pickup module 304 configures the receiver channels to incorporate their respective adjustments (if any, as the case may be for each receiver channel) into signals (for example, data signals) that are subsequently received via the receiver channels, respectively. Control then passes to block 1024.

At block 1024, the calibration module 106, for example, the weighting and calibration processor 302 thereof, determines whether to terminate the startup receiver channel beamforming calibration method 1000, for instance, if the system 100 is placed in a standby mode, if calibration is disabled, if the system 100 is preconfigured to execute the method 1000 only once upon startup, and/or the like. If the calibration module 106 determines at block 1024 to terminate the startup receiver channel beamforming calibration method 1000 ("YES" at block 1024), then the calibration module 106 terminates the method 1000. If the calibration module 106 determines at block 1024 not to terminate the startup receiver channel beamforming calibration method 1000 ("NO" at block 1024), then control passes back to block 1002 to repeat the startup receiver channel beamforming calibration method 1000 in the manner described above.

Figure 11:
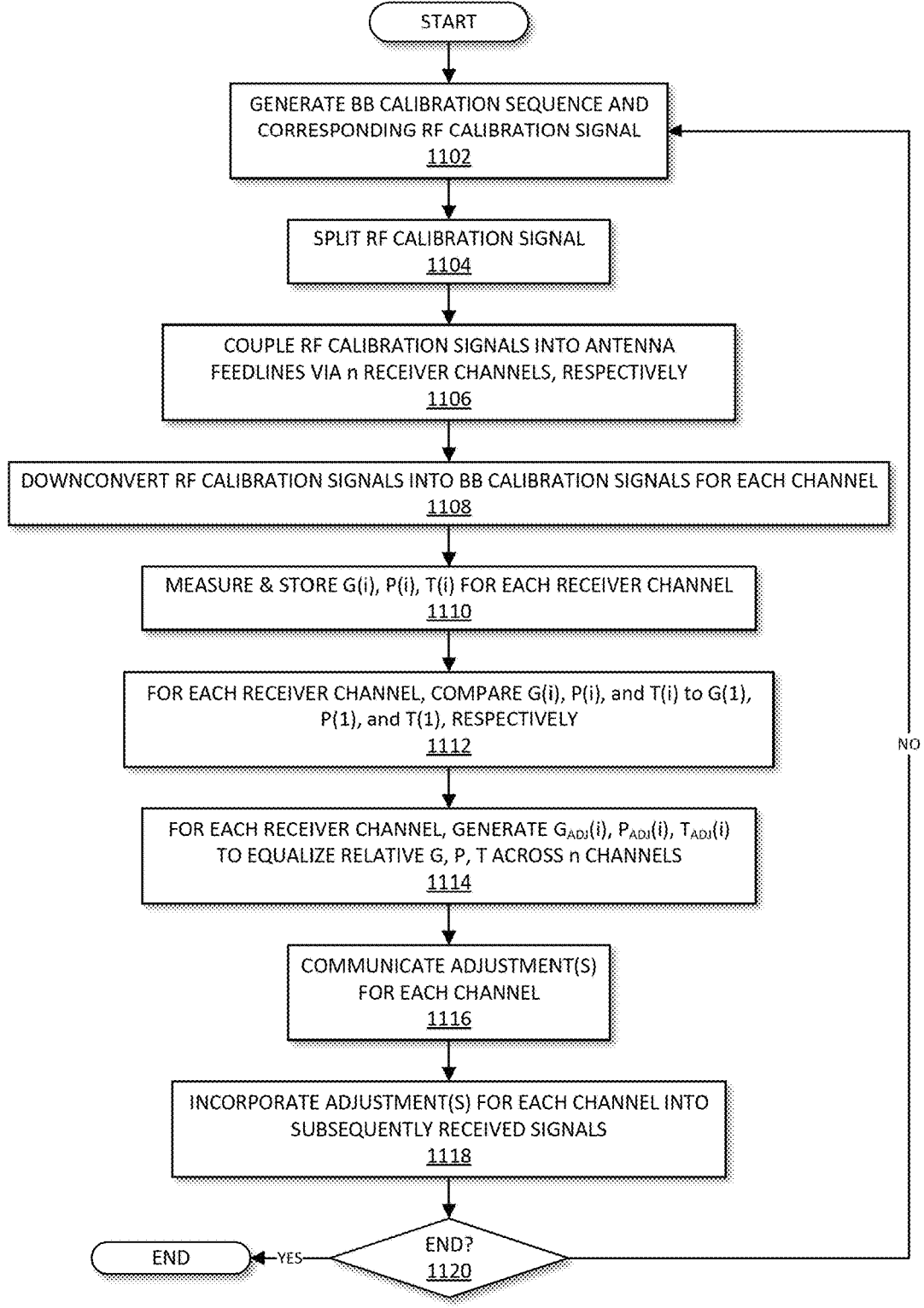
FIG. 11 is a flowchart showing an illustrative method for performing beamforming calibration of receiver channels in a startup mode, in accordance with an embodiment of the present disclosure.

FIG. 11 is a flowchart showing an illustrative method 1100 for performing beamforming calibration of receiver channels of the system 100 in a startup mode, in accordance with an embodiment of the present disclosure. At block 1102, the weighting and calibration processor 302 generates a calibration sequence to be used for the multiple receiver channels of the system 100, generates a baseband calibration signal based on the calibration sequence, and forwards the baseband calibration signal to the calibration transmitter 306, which upconverts the baseband calibration signal into an RF calibration signal.

In some embodiments, the receiver channels of the system 100 are calibrated one at a time relative to the other receiver channel(s), with portions of the procedure 1100 being repeated for each receiver channel calibration. In other embodiments, the receiver channels of the system 100 are calibrated in parallel using a single transmit event.

At block 1104, the RF calibration signal is forwarded from the calibration transmitter 306 to the splitter 312, which splits the RF calibration signal into multiple substantially similar RF calibration signals. The splitter 312 forwards the RF calibration signals to the RF couplers 310, respectively, of the receiver channels. Each RF coupler 310, in turn, couples the RF calibration signal to its corresponding antenna feedline. Alternatively, as noted above in connection with FIG. 2, in some embodiments, instead of including the RF couplers 310 and the splitter 312, the injection module 308 includes the calibration antenna element 314 that is positioned within a predetermined distance from the antenna array 108. The calibration antenna element 314 receives the RF calibration signal from the calibration transmitter module 306, converts the RF calibration signal into a corresponding EM calibration signal, and transmits the EM calibration signal to the receiver channels of the transmitter and receiver module 104 via corresponding antenna elements of the antenna array 108. At block 1108, each receiver of the transmitter and receiver module 104 downconverts the RF calibration signal to a corresponding baseband calibration signal, and forwards the baseband calibration signal to the weighting matrix and calibration pickup module 304 for processing.

At block 1110, the weighting and calibration processor 302 computes and stores characteristics of the baseband calibration signals, such as gain, phase, timing differences among the calibration signals corresponding to the respective receiver channels. The computation at block 1110, in some examples, is performed in a manner similar to that described above in connection with block 616 (FIG. 6).

At block 1112, the weighting and calibration processor 302 compares the calibration signal gain, phase, and timing measured at block 1110 for each receiver channel against the calibration signal gain, phase, and timing measured at block 1110 for receiver channel 1, which, in this example, serves as the baseline against which all other receiver channels are compared. In this manner, the weighting and calibration processor 302 identifies, quantifies, and/or characterizes relative differences in gain, phase, and timing across receiver channels.

At block 1114, the weighting and calibration processor 302 generates, based upon the results of the comparing at block 1112, any adjustments to be made to the gain, phase, or timing of each receiver channel to equalize signals subsequently received via each receiver channel i. As described above, the adjustments generated at block 1114 may be generated based at least in part upon one or more thresholds of differences in gain, phase, or timing that are predetermined to be acceptable.

At block 1116 the weighting and calibration processor 302 communicates to the weighting matrix and calibration pickup module 304 the respective adjustments that were generated at block 1114 for the receiver channels of the system 100. At block 1118, the weighting matrix and calibration pickup module 304 configures the receiver channels to incorporate their respective adjustments (if any, as the case may be for the various receiver channels) into signals (for example, data signals) that are subsequently received via those receiver channels, respectively. Control then passes to block 1120.

At block 1120, the calibration module 106, for example, the weighting and calibration processor 202 thereof, determines whether to terminate the startup receiver channel beamforming calibration method 1100, for instance, if the system 100 is placed in a standby mode, if calibration is disabled, if the system 100 is preconfigured to execute the method 1100 only once upon startup, and/or the like. If the calibration module 106 determines at block 1120 to terminate the startup receiver channel beamforming calibration method 1100 ("YES" at block 1120), then the calibration module 106 terminates the method 1100. If the calibration module 106 determines at block 1120 not to terminate the startup receiver channel beamforming calibration method 1100 ("NO" at block 1120), then control passes back to block 1102 to repeat the startup receiver channel beamforming calibration method 1100 in the manner described above.

Figure 12:
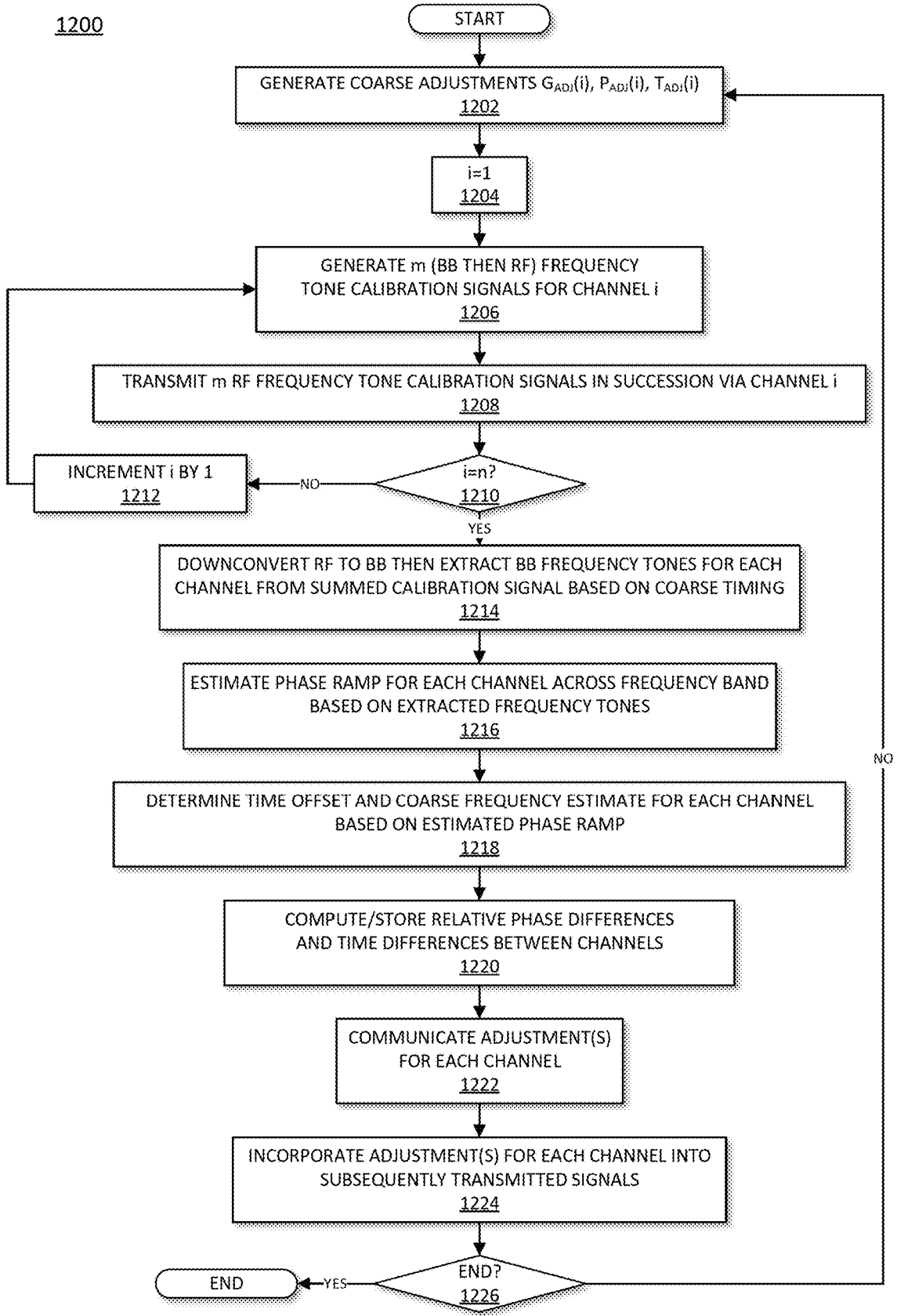
FIG. 12 is a flowchart showing an illustrative method for performing beamforming calibration of receiver channels in a startup mode, in accordance with another embodiment of the present disclosure.

FIG. 12 is a flowchart showing an illustrative method 1200 for performing beamforming calibration of receiver channels of the system 100 in a startup mode, in accordance with another embodiment of the present disclosure. At block 1202, the calibration module 106 generates coarse gain, phase, and timing adjustments for each receiver channel of the system 100, for example, by executing one or more iterations of the calibration method 1100 described above. As described in further detail below, in the procedure 1200, the receiver channels of the system 100 are calibrated one at a time relative to the other receiver channel(s), with portions of the procedure 1200 being repeated for each receiver channel calibration. To that end, an index i is used to represent the particular receiver channel being calibrated at a particular stage of the procedure 1200. At block 1204, the weighting and calibration processor 302 initializes the index i by setting i equal to 1, corresponding to the first receiver channel being calibrated.

At block 1206, the weighting and calibration processor 302 generates multiple (specifically, m, where m is an integer that represents the number of discrete frequency tones used to perform calibration at various frequencies across an operational frequency band) baseband frequency tone calibration signals for the receiver channel i of the system 100. The weighting and calibration processor 302 forwards the m baseband frequency tone calibration signals to the calibration transmitter 306 for successive propagation through the receiver channel i being calibrated at this iteration.

At block 1208, the calibration transmitter 306 upconverts the respective baseband frequency tone calibration signals into respective RF frequency tone calibration signals, and provides, in succession, each of the RF frequency tone calibration signals to the splitter 312. The RF frequency tone calibration signals are forwarded, by way of the splitter 312, to respective RF couplers 310 of the receiver channels that couple the summed RF calibration signals to the antenna feedlines, respectively. Alternatively, as noted above in connection with FIG. 2, in some embodiments, instead of including the RF couplers 310 and the combiner 312, the injection module 308 includes the calibration antenna element 314 that is positioned within a predetermined distance from the antenna array 108. The calibration antenna element 314 receives the RF calibration signals from the calibration transmitter module 306, converts the RF calibration signals into corresponding summed EM calibration signals, and transmits the summed EM calibration signals to the receiver channels of the transmitter and receiver module 104 via corresponding antenna elements of the antenna array 108.

At block 1210, the weighting and calibration processor 302 determines whether the index i is equivalent to the number of receiver channels n of the system 100. If the weighting and calibration processor 302 determines at block 1210 that the index i is not equivalent to the number of receiver channels n of the system 100 ("NO" at block 1210), then at block 1212 the index i is incremented by 1 and control passes back to block 1206 to calibrate the next receiver channel in the manner described above. If, on the other hand, the weighting and calibration processor 302 determines at block 1210 that the index i is equivalent to the number of receiver channels n of the system 100 ("YES" at block 1210), then control passes to block 1214.

At block 1214, each receiver of the transmitter and receiver module 104 downconverts the respective RF calibration signal of frequency tones to a corresponding baseband calibration signal of frequency tones, extracts the individual baseband frequency tone calibration signals from the baseband calibration signal of frequency tones, and forwards the extracted baseband frequency tone calibration signals to the weighting and calibration processor 302 by way of the weighting matrix and calibration pickup module 304. At block 1216, based on the baseband frequency tone calibration signals extracted at block 1214, the weighting and calibration processor 302 estimates a phase ramp for each receiver channel across the operational frequency band.

At block 1218, the weighting and calibration processor 302 determines, based on the phase ramps estimated for the respective receiver channels, a time offset and a coarse frequency estimate for each receiver channel. At block 1220, the weighting and calibration processor 302 computes and stores relative phase differences and relative time differences between the receiver channels. The weighting and calibration processor 302, at block 1222, generates, based at least in part upon the phase differences and time differences computed at block 1220, any adjustments to be made to the gain, phase, or timing of the receiver channels to equalize signals subsequently received via those receiver channels. As described above, the adjustments generated at block 1222 may be generated based at least in part upon one or more thresholds of differences in gain, phase, or timing that are predetermined to be acceptable. The weighting and calibration processor 302 communicates to the weighting matrix and calibration pickup module 304 the respective adjustments that may have been generated for the receiver channels of the system 100. At block 1224, the weighting matrix and calibration pickup module 304 configures the receiver channels to incorporate their respective adjustments (if any, as the case may be for the various receiver channels) into signals (for example, data signals) that are subsequently received via those receiver channels, respectively. Control then passes to block 1226.

At block 1226, the calibration module 106, for example, the weighting and calibration processor 302 thereof, determines whether to terminate the startup receiver channel beamforming calibration method 1200, for instance, if the system 100 is placed in a standby mode, if calibration is disabled, if the system 100 is preconfigured to execute the method 1200 only once upon startup, and/or the like. If the calibration module 106 determines at block 1226 to terminate the startup receiver channel beamforming calibration method 1200 ("YES" at block 1226), then the calibration module 106 terminates the method 1200. If the calibration module 106 determines at block 1226 not to terminate the startup receiver channel beamforming calibration method 1200 ("NO" at block 1226), then control passes back to block 1202 to repeat the startup receiver channel beamforming calibration method 1200 in the manner described above.

Figure 13:
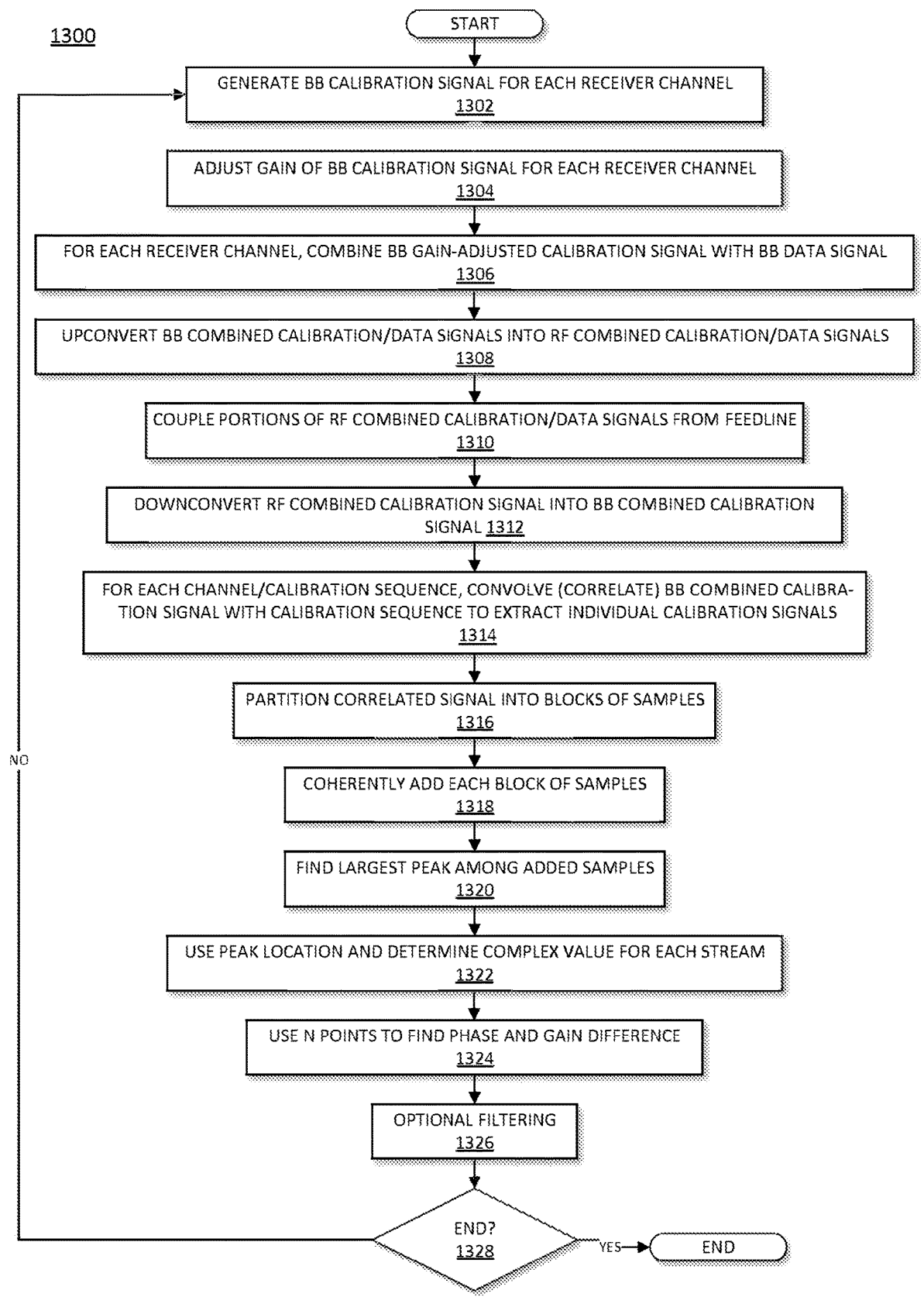
FIG. 13 is a flowchart showing an illustrative method for performing beamforming calibration of receiver channels in a runtime mode, in accordance with an embodiment of the present disclosure.

FIG. 13 is a flowchart showing an illustrative method 1300 for performing beamforming calibration of receiver channels of the system 100 in a runtime mode, in accordance with an embodiment of the present disclosure. Before describing the method 1300 in detail, a general description will be provided. The method 1300 generally includes applying a known test stimulus to the system 100 and subsequently observing the performance of the system in response to the stimulus. The calibration method 1300 is executed during runtime, and various techniques are contemplated for use in the method 900 in how to perform calibration without disturbing the continuous uninterrupted radio operation of the system 100. For instance, runtime calibration may involve (1) using a DC subcarrier, (2), using an out-of-band carrier, or (3) using a low-amplitude carrier with coding gain extraction.

Runtime calibration using a DC subcarrier makes use of a region around the center RF frequency (the DC subcarrier, as seen by the baseband), which is unused for data service due to various artifacts introduced in that frequency region by the radio electronics. With this approach, which involves rejecting the artifacts, modest signal amplitudes applied in the DC subcarrier are ignored by the communication system, making this region attractive for calibration use. Runtime calibration using an out-of-band carrier makes use of the fact that band filtering imposed by the signal chain in radio communication systems is larger, if only slightly, than the actual bandwidth of the communications. The unused gap between the filtered bandwidth and the utilized bandwidth is used for calibration. Runtime calibration using a low-amplitude carrier with coding gain extraction makes use of the fact that radio communication systems are engineered to operate in the presence of noise. The calibration signal is introduced that, to conventional systems, appears to be noise, so ordinary communication operation is unaffected or only minimally affected. To counter the noisiness of the result of the calibration transmission, a coded sequence is used as the calibration signal, and coding gain (correlation) is used to extract the signal out of the noise. Additional details of runtime calibration using the low-amplitude carrier with coding gain extraction are provided below in connection with FIG. 13.

Various types of calibration signals or sequences may be employed for implementing runtime calibration using low-amplitude carrier with coding gain extraction. For instance, calibration signals suitable for this purpose may have certain characteristics, namely: (1) a cyclic or period code which is naturally periodic or made cyclic through truncation, (2), low or zero autocorrelation for measuring timing alignment, (3) multiple orthogonal bases, whereby the code allows for bases or seeds which produce multiple codes with the same characteristics but low cross-correlation between them (this may be used to create unique stimuli for each transmission path while allowing them to be cleanly differentiated from each other), and (4) constant amplitude, (for instance, over a short term average), to avoid generation of potentially problematic structure noise for the communication system in either a time domain or a frequency domain. Exemplary types of signals that are suitable for such calibration include Zadoff-Chu sequences, in particular, or constant amplitude zero autocorrelation (CAZAC) codes in general.

At block 1302, the weighting and calibration processor 302 generates a baseband calibration signal for each of the receiver channels of the system 100. In some embodiments, the baseband calibration signals are Zadoff-Chu (ZC) sequences and each baseband calibration signal has a length equal to a length of an LTE symbol including a cyclic prefix.

At block 1304, the weighting and calibration processor 302 adjusts the respective gains of the baseband calibration signals for the receiver channels. In some embodiments, the gain adjustments at block 1304 are used to adjust the amplitude of the calibration signals relative to a data signal, such as an LTE signal, with which the calibration signals are to be combined. In this manner, the calibration signal may be adjusted to have an amplitude that is buried below a noise threshold of the data signal (for example, 20 dB lower than the data signal), such that conventional user equipment receiving the signal does not detect the calibration signal. The calibration signal appears to be noise to conventional user equipment. In some embodiments, the amplitude of the calibration signal may be increased at block 1304, which may enable runtime calibration to execute more quickly, at the cost of increasing the noise level.

At block 1306, the weighting and calibration processor 302 combines the baseband gain-adjusted calibration signals with corresponding baseband data signals for each of the receiver channels of the system 100. At block 1308, the calibration transmitter 306 upconverts the baseband combined data and calibration signals into RF combined data and calibration signals.

At block 1310, the RF calibration signals are forwarded, by way of the splitter 312, to respective RF couplers 310 of the receiver channels that couple the RF calibration signals to the antenna feedlines, respectively. Alternatively, as noted above in connection with FIG. 2, in some embodiments, instead of including the RF couplers 310 and the combiner 312, the injection module 308 includes the calibration antenna element 314 that is positioned within a predetermined distance from the antenna array 108. The calibration antenna element 314 receives the RF calibration signals from the calibration transmitter module 306, converts the RF calibration signals into corresponding EM calibration signals, and transmits the EM calibration signals to the receiver channels of the transmitter and receiver module 104 via corresponding antenna elements of the antenna array 108.

At block 1312, each receiver of the transmitter and receiver module 104 downconverts the RF combined data and calibration signal to a baseband combined data and calibration signal, and forwards the baseband combined data and calibration signal to the weighting and calibration processor 302 by way of the weighing matrix and calibration pickup module 304 for processing. At block 1314, for each of the receiver channels, the weighting and calibration processor 302 convolves (correlates) the baseband combined data and calibration signal with the calibration sequence generated for that receiver channel at block 1302 to extract individual calibration signals for each receiver channel. At block 1316, for each receiver channel, the weighting and calibration processor 302 partitions each correlated signal from block 1314 into blocks of samples. At block 1318, the weighting and calibration processor 302 coherently adds the blocks of samples generated at block 1316, effectively generating an average of the samples. In this manner, at block 1318, n averaged correlation sequences are generated, one for each receiver channel.

At block 1320, the weighting and calibration processor 302 measures and stores, for each of the n correlation sequences obtained at block 1318, the peak magnitudes of the correlation sequence. At block 1322, the weighting and calibration processor 302, for each of the n correlation sequences, identifies a location within the sequence at which the peak is located and generates one complex value representing that peak. At block 1324, the weighting and calibration processor 302 finds a gain difference and phase difference for each receiver channel based on the complex value generated at block 1322 for that receiver channel. At block 1326, the weighting and calibration processor 302 performs an optional filtering step. Control then passes to block 1328.

At block 1328, the calibration module 106, for example, the weighting and calibration processor 302 thereof, determines whether to terminate the runtime receiver channel beamforming calibration method 1300, for instance, if the system 100 is placed in a standby mode, if calibration is disabled, and/or the like. If the calibration module 106 determines at block 1328 to terminate the startup receiver channel beamforming calibration method 1300 ("YES" at block 1328), then the calibration module 106 terminates the method 1300. If the calibration module 106 determines at block 1328 not to terminate the startup receiver channel beamforming calibration method 1300 ("NO" at block 1328), then control passes back to block 1302 to repeat the runtime receiver channel beamforming calibration method 1300 in the manner described above.

The embodiments disclosed herein are examples of the present information systems and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present information systems in virtually any appropriately detailed structure. Like reference numerals may refer to similar or identical elements throughout the description of the figures.

The phrases "in an embodiment," "in embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

The systems and/or methods described herein may utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms. In example embodiments that employ a combination of multiple controllers and/or multiple memories, each function of the systems and/or methods described herein can be allocated to and executed by any combination of the controllers and memories.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Any of the herein described methods, programs, algorithms or codes may be contained on one or more non-transitory computer-readable or machine-readable media or memory. The term "memory" may include a mechanism that provides (in an example, stores and/or transmits) information in a form readable by a machine such a processor, computer, or a digital processing device. For example, a memory may include a read only memory (ROM), random access memory (RAM), magnetic disk storage media, optical storage media, flash memory devices, or any other volatile or non-volatile memory storage device. Code or instructions contained thereon can be represented by carrier wave signals, infrared signals, digital signals, and by other like signals.

The foregoing description is only illustrative of the present information systems. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A method for performing beamforming calibration of transmitter channels of a system in a startup mode, the method comprising:
    generating, by one or more processors, a gain adjustment for each of the transmitter channels of the system;
    generating, by the one or more processors, a phase adjustment for each of the transmitter channels of the system;
    generating, by the one or more processors, a timing adjustment for each of the transmitter channels of the system; and
    calibrating, by the one or more processors, each one of the transmitter channels relative to other ones of the transmitter channels by:
        updating, by the one or processors, at least one of the gain adjustment, the phase adjustment or the timing adjustment of the transmitter channels to equalize signals subsequently transmitted via the transmitter channels, and
        incorporating, by the one or more processors, the updated gain, phase and timing adjustments of the transmitter channels into signals subsequently transmitted via respective ones of the transmitter channels.

2. The method of claim 1, wherein the calibrating further includes:
    generating a predetermined number of baseband frequency tone calibration signals.

3. The method of claim 2, wherein the calibrating further includes:
    propagating the predetermined number of baseband frequency tone calibration signals through a respective one of the transmitter channels.

4. The method of claim 3, wherein the calibrating further includes:
    upconverting the baseband frequency tone calibration signals into radio frequency (RF) frequency tone calibration signals.

5. The method of claim 4, wherein the calibrating further includes:
    transmitting in succession each of the RF frequency tone calibration signals into free space.

6. The method of claim 1, wherein the calibrating further includes:
    generating a summed radio frequency (RF) frequency tone calibration signal by summing a plurality of RF frequency tone calibration signals.

7. The method of claim 6, wherein the calibrating further includes:
    downconverting the summed RF frequency tone calibration signal to a summed baseband frequency tone calibration signal.

8. The method of claim 1, wherein the calibrating further includes:
    extracting individual baseband tone calibration signals from a summed baseband frequency tone calibration signal.

9. The method of claim 8, wherein the calibrating further includes:
    estimating, for each of the transmitter channels, a phase ramp based on the extracted individual baseband tone calibration signals.

10. The method of claim 9, wherein the calibrating further includes:
    determining, based on the estimated phase ramps, a time offset and a coarse frequency estimate for each transmitter channel.

11. The method of claim 1, wherein the calibrating further includes:
    computing and storing relative phase differences and relative time differences between the transmitter channels.

12. A method for performing beamforming calibration of receiver channels of a system in a startup mode, the method comprising:
    generating, by one or more processors, a gain adjustment for each of the receiver channels of the system;
    generating, by the one or more processors, a phase adjustment for each of the receiver channels of the system;
    generating, by the one or more processors, a timing adjustment for each of the receiver channels of the system; and
    calibrating, by the one or more processors, each one of the receiver channels relative to other ones of the receiver channels by:
        updating, by the one or more processors, at least one of the gain adjustment, the phase adjustment or the timing adjustment of the receiver channels to equalize signals subsequently receiver via the receiver channels; and incorporating, by the one or more processors, the updated gain, phase and timing adjustments of the receiver channels into signals subsequently received via respective ones of the receiver channels.

13. The method of claim 12, wherein the calibrating further includes:
generating a predetermined number of baseband frequency tone calibration signals.

14. The method of claim 13, wherein the calibrating further includes:
propagating the predetermined number of baseband frequency tone calibration signals through a respective one of the receiver channels.

15. The method of claim 14, wherein the calibrating further includes:
upconverting the baseband frequency tone calibration signals into radio frequency (RF) frequency tone calibration signals.

16. The method of claim 12, wherein the calibrating further includes:
generating a summed radio frequency (RF) frequency tone calibration signal by summing a plurality of RF frequency tone calibration signals.

17. The method of claim 16, wherein the calibrating further includes:
downconverting the summed RF frequency tone calibration signal to a summed baseband frequency tone calibration signal; and
extracting individual baseband tone calibration signals from the summed baseband frequency tone calibration signal.

18. The method of claim 17, wherein the calibrating further includes:
estimating, for each of the receiver channels, a phase ramp based on the extracted individual baseband tone calibration signals.

19. The method of claim 18, wherein the calibrating further includes:
determining, based on the estimated phase ramps, a time offset and a coarse frequency estimate for each receiver channel.

20. The method of claim 12, wherein the calibrating further includes:
computing and storing relative phase differences and relative time differences between the receiver channels.

* * * * *